United States Patent
Tominaga et al.

(10) Patent No.: US 9,722,338 B2
(45) Date of Patent: Aug. 1, 2017

(54) ELECTRIC CABLE STRUCTURAL BODY, ELECTRIC CONNECTION STRUCTURE, AND METHOD FOR PRODUCING ELECTRIC CABLE STRUCTURAL BODY

(71) Applicants: FURUKAWA ELECTRIC CO., LTD., Tokyo (JP); FURUKAWA AUTOMOTIVE SYSTEMS INC., Inukami-gun (JP)

(72) Inventors: Michihiko Tominaga, Inukami-gun (JP); Naoya Sakaki, Inukami-gun (JP); Makoto Nishimura, Inukami-gun (JP); Takehide Ikeda, Inukami-gun (JP); Atsushi Taba, Inukami-gun (JP); Takuya Komatsu, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 56 days.

(21) Appl. No.: 14/818,811

(22) Filed: Aug. 5, 2015

(65) Prior Publication Data
US 2016/0036151 A1   Feb. 4, 2016

Related U.S. Application Data

(63) Continuation of application No. PCT/JP2014/052558, filed on Feb. 4, 2014.

(30) Foreign Application Priority Data

Feb. 5, 2013 (JP) .................................. 2013-020028
Mar. 6, 2013 (JP) .................................. 2013-043700

(51) Int. Cl.
*H01R 43/16* (2006.01)
*H01R 13/02* (2006.01)
(Continued)

(52) U.S. Cl.
CPC ......... *H01R 13/02* (2013.01); *B60R 16/0207* (2013.01); *H01B 7/009* (2013.01);
(Continued)

(58) Field of Classification Search
CPC combination set(s) only.
See application file for complete search history.

(56) References Cited

U.S. PATENT DOCUMENTS 3,727,168 A * 4/1973 Henschen ............... H01B 7/08
361/749
4,902,241 A * 2/1990 Lockard ............... H01R 12/616
439/395

(Continued)

FOREIGN PATENT DOCUMENTS

CN    1471209 A    1/2004
JP    48-044785 A  6/1973
(Continued)

OTHER PUBLICATIONS

English Translation of the International Search Report issued Mar. 25, 2014 in PCT/JP2014/052558 filed Feb. 4, 2014.
(Continued)

*Primary Examiner* — Timothy Thompson
*Assistant Examiner* — Krystal Robinson
(74) *Attorney, Agent, or Firm* — Oblon, McClelland, Maier & Neustadt, L.L.P.

(57) ABSTRACT

A first direction exposed conductor group includes a plurality of exposed conductor portions of a first flat cable, and a second direction exposed conductor group includes a plurality of exposed conductor portions of a second flat cable. The plurality of exposed conductor portions are located parallel to each other, and the plurality of exposed conductor portions are located parallel to each other. The first direction exposed conductor group and the second direction exposed
(Continued)

conductor group intersect and overlap each other to form an intersection overlap portion. An intersection insulating film is provided between the first direction exposed conductor group and the second direction exposed conductor group at the intersection overlap portion. The exposed conductor portions and the exposed conductor portions facing each other via windows of the intersection insulating film are connected to be conductive to each other. Thus, an electric cable structural body is provided.

15 Claims, 33 Drawing Sheets

(51) Int. Cl.
H01R 4/02 (2006.01)
H01B 7/00 (2006.01)
H01B 7/08 (2006.01)
B60R 16/02 (2006.01)
H01R 12/61 (2011.01)

(52) U.S. Cl.
CPC ......... *H01B 7/0045* (2013.01); *H01B 7/0823* (2013.01); *H01R 4/021* (2013.01); *H01R 43/16* (2013.01); *H01R 12/61* (2013.01)

(56) References Cited

U.S. PATENT DOCUMENTS

| | | | | |
|---|---|---|---|---|
| 5,009,612 A | * | 4/1991 | Rishworth | H01R 12/616 439/403 |
| 6,457,989 B1 | | 10/2002 | Aoki et al. | |
| 2003/0070830 A1 | | 4/2003 | Kondo et al. | |
| 2004/0003938 A1 | | 1/2004 | Yoshida et al. | |

FOREIGN PATENT DOCUMENTS

| | | | |
|---|---|---|---|
| JP | 62-105308 A | | 5/1987 |
| JP | 62-147608 A | | 7/1987 |
| JP | 01-161611 A | | 6/1989 |
| JP | 07-114828 A | | 5/1995 |
| JP | 07-263049 A | | 10/1995 |
| JP | 7-263050 A | | 10/1995 |
| JP | 07263050 A | * | 10/1995 |
| JP | 07-312239 A | | 11/1995 |
| JP | 08-017259 A | | 1/1996 |
| JP | 09-027377 A | | 1/1997 |
| JP | 2000-152465 A | | 5/2000 |
| JP | 2000152465 A | * | 5/2000 |
| JP | 2001-076779 A | | 3/2001 |
| JP | 2003-123545 A | | 4/2003 |
| JP | 2003-257513 A | | 9/2003 |
| JP | 2004-040903 A | | 2/2004 |
| JP | 2006-032145 A | | 2/2006 |
| JP | 2008-108578 A | | 5/2008 |
| JP | 2012-60790 A | | 3/2012 |
| JP | 2012-195081 A | | 10/2012 |
| JP | 2012-212626 A | | 11/2012 |

OTHER PUBLICATIONS

Office Action issued on Nov. 10, 2015 in Japanese Patent Application No. 2013-43700 (with English translation).
Combined Chinese Office Action and Search Report issued on Jun. 20, 2016 in Patent Application No. 201480019645.8 (with English translation).
International Search Report issued on Mar. 25, 2014 in PCT/JP2014/052558 (submitting original only, English translation previously filed).
Written Opinion issued Mar. 25, 2014 in PCT/JP2014/052558 (with English translation).
Office Action drafted on Jan. 12, 2017 in Japanese Patent Application No. 2013-020028 (with unedited computer generated English translation).
Office Action issued on Dec. 29, 2016 in Chinese Patent Application No. 201480019645.8 (with English translation).

* cited by examiner

ELECTRIC CABLE STRUCTURAL BODY, ELECTRIC CONNECTION STRUCTURE, AND METHOD FOR PRODUCING ELECTRIC CABLE STRUCTURAL BODY

CROSS-REFERENCE TO RELATED APPLICATIONS

This application is a continuation application of PCT International Application No. PCT/JP2014/052558 filed Feb. 4, 2014, which claims priority to Japanese Application No 2013-020028 filed Feb. 5, 2013, and Japanese Application No. 2013-043700 filed on Mar. 6, 2013, each of which are herein incorporated by reference in their entity for all purposes.

TECHNICAL FIELD

The present invention relates to an electric cable structural body, an electric connection structure, and a method for producing an electric cable structural body.

Alternatively, the present invention relates to an electric cable structural body and an electric connection structure, by which in an electric cable group intersection portion including a plurality of electric cable intersection portions where first covered electric cables and second covered electric cables intersect each other, a covered electric cable and a second covered electric cable are connected to each other in an electrically conductive state at a predetermined electric cable intersection portion in accordance with a desirable wiring pattern, and also relates to a method for producing such an cable structural body.

BACKGROUND ART

Recently, a vehicle accommodates various types of electric devices including a lamp, an audio device, an ABS, a rear camera and the like. The vehicle also includes a wire harness that supplies electric power or control signals to these various types of electric devices.

Such wire harnesses are different in the number of signal lines or the number of power lines in accordance with the type of the vehicle, or in accordance with the grade or specifications of the same type of vehicle. Alternatively, the connection route needs to be varied in accordance with the positional arraignment of the electric devices. For such reasons, different wire harnesses and different connectors that connect the wire harnesses need to be provided for each type, grade or specifications.

It is increasingly demanded that a common wire harness or a common connector that connect the wire harnesses should be usable for any type, grade or specifications of the vehicle in order to reduce the cost. For realizing this, it is conceivable to connect common wire harnesses by connection members in accordance with the type, grade or specifications of the vehicle.

For example, Patent Document 1 proposes the following branch connector. Covered electric cable groups, each including covered electric cables located parallel to each other, are put to intersect and overlap each other. There are intersection portions where the covered electric cables intersect each other in an overlapping state. Among the intersection portions, there may be an intersection portion where covered electric cables that are desired to be conductive to each other intersect each other. At such an intersection portion, the electric cables are connected to be conductive to each other by use of a crimp terminal.

In the case where a branch connector having such a structure proposed in Patent Document 1 is used as a connection member that connect the wire harnesses as described above, the following occurs. Among the intersection portions where the covered electric cables intersect each other in an overlapping state, there may be an intersection portion where covered electric cables that are desired to be conductive to each other intersect each other. Such an intersection portion is selected in accordance with the type, grade or specifications of the vehicle. At such an intersection portion, the electric cables are connected by use of a crimp terminal while, for example, the specification manual is checked. Therefore, there is an undesirable possibility that the connection is made at a wrong intersection portion, or that the connection at the intersection portion by use of the crimp terminal is troublesome. There is another undesirable possibility that the number of components including the crimp terminal is increased, which fails to improve the production efficiency or to reduce the cost sufficiently.

CITATION LIST

Patent Literature

Patent Document 1: Japanese Laid-Open Patent Publication No. 2001-76779

SUMMARY OF INVENTION

Technical Problem

The present invention has an object of providing an electric cable structural body, an electric connection structure, and a method for producing an electric cable structural body, by which conductors at a desirable intersection portion, among intersection portions where conductors intersect each other in an overlapping manner, are connected to each other accurately and efficiently to provide a desirable connection route.

Alternatively, the present invention has an object of providing an electric cable structural body, by which a first covered electric cable and a second covered electric cable in an electric cable group intersection portion are positionally arranged easily and accurately so as to provide a desirable wiring pattern with no use of a dedicated jig.

Solution to Problem

The present invention is directed to an electric cable structural body, including: a first direction exposed conductor group including a plurality of exposed conductor portions extending in a first direction while being parallel to each other; a second direction exposed conductor group including a plurality of exposed conductor portions extending in a second direction while being parallel to each other. The plurality of exposed conductor portions are each obtained from a conductor covered with an insulating cover by removing a predetermined length of the insulating cover in a longitudinal direction. The first direction exposed conductor group and the second direction exposed conductor group intersect and overlap each other to form an intersection overlap portion; the electric cable structural body further comprising an insulating unit provided between the first direction exposed conductor group and the second direction exposed conductor group at the intersection overlap portion, the insulating unit electrically insulating the exposed conductor portions from each other. The insulating unit has windows at positions corresponding to conductor intersection portions at which the exposed conductor portions are to be conductive to each other, among intersection portions at which the exposed conductor portions intersect each other, the windows passing through the insulating unit such that the exposed conductor portions intersecting each other face each other via the windows; and the exposed conductor portions facing each other via the windows are connected to be conductive to each other. The present invention is also directed to a method for producing the same.

The expression "conductor covered with an insulating cover" will be explained. In the case where each conductor is covered with an insulating cover to form a covered electric cable, the "conductor" refers to such a conductor. In the case where a plurality of rectangular conductors or the like are located to extend in the same direction with a predetermined distance and are covered together with an insulating cover such as an insulating film or the like to form a flat cable, the "conductor" refers to such a rectangular conductor. The concept represented by the "conductor covered with an insulating cover" also encompasses a single conductor, a twisted cable formed of a plurality of twisted wires.

The expression that "the exposed conductor portions intersecting each other face each other" refers to a state where the exposed conductor portions are in direct contact with each other via the window passing through the insulating unit, or directly face each other with a small gap provided therebetween.

The exposed conductor portions at the intersection portion may be connected to each other to form a conductor intersection portion by, for example, electric resistance welding, supersonic vibration welding, laser welding or the like.

According to the present invention, the conductors at a desirable intersection portion, among intersection portions where conductors intersect each other in an overlapping manner, are connected to each other accurately and efficiently to provide a desirable connection route.

This will be described in more detail. Exposed conductor groups each including a plurality of exposed conductor portions extending in predetermined directions while being parallel to each other are put to intersect and overlap each other to form an intersection overlap portion. The exposed conductor portions intersect each other at intersection portions. As it is, at all the intersection portions, the exposed conductor portions are in contact with, and thus conductive to each other. In the case where an insulating unit is provided between the exposed conductor portions in the intersection overlap portion, the exposed conductor portions are insulated from each other at all the intersection portions because of the insulating unit located between the exposed conductor portions.

In the insulating unit, windows passing through the insulating unit are provided at positions corresponding to conductor intersection portions at which the exposed conductor portions are to be conductive to each other, among the intersection portions in the intersection overlap portion. Via the windows, the exposed conductors intersecting each other at the conductor intersection portions directly face each other. At the remaining intersection portions, the exposed conductors are insulated from each other because of the insulating unit located between the exposed conductors. Via the windows passing through the insulating unit, the exposed conductor facing each other are connected to be conductive to each other. In this manner, the conductors are connected to each other accurately and efficiently at the desirable intersection portions, among the intersection portions where the conductors intersect each other in an overlapping state.

This will be described specifically. An insulating unit having windows at positions corresponding to the desirable conductor intersection portions in accordance with the type, grade or specifications of the vehicle is merely located between the first direction exposed conductor group and the second direction exposed conductor group in the intersection overlap portion. Thus, the exposed conductor portions are insulated from each other with certainty at the intersection portions other than the conductor intersection portions, whereas the exposed conductors are connected to be conductive to each other at the conductor intersection portions via the windows passing through the insulating unit. Thus, for example, it is not necessary to look for the conductor intersection portions while checking with the specification manual. Therefor, there is no possibility that the connection is made at a wrong intersection portion, or that the connection at the intersection portion by use of the crimp terminal is troublesome. The exposed conductors are connected only at the conductor intersection portions with certainty to form a desirable connection route.

The insulating unit having windows at positions corresponding to the conductor intersection portions, which are desirable intersection portions, in accordance with the type, grade or specifications of the vehicle is merely located between the first direction exposed conductor group and the second direction exposed conductor group in the intersection overlap portion. Therefore, the number of components such as crimp terminals or the like is not increased in accordance with the number of the conductor intersection portions. This increases the production efficiency and sufficiently reduces the cost.

The insulating unit having windows at positions corresponding to the conductor intersection portions, which are desirable intersection portions, in accordance with the type, grade or specifications of the vehicle is merely located between the first direction exposed conductor group and the second direction exposed conductor group in the intersection overlap portion. Therefore, even in a severe use environment where, for example, a vibration at a high acceleration defined as 10G in the engine room or as 4G in the vehicle occurs, or the temperature difference between the high temperature and the low temperature is large, the conductor intersection portions are kept conductive and the other intersection portions are kept insulated stably. In the case where, for example, the exposed conductor portions are connected to be conductive to each other by use of a crimp terminal, the crimp terminal may come off because of the vibration and thus the exposed conductive portions are not kept conductive. According to the present invention, such inconvenience does not occur.

Except for the insulating unit having windows at positions corresponding to the conductor intersection portions, which are desirable intersection portions, in accordance with the type, grade or specifications of the vehicle, all the components are commonly used. Use of such common components reduces the cost.

In an embodiment of the present invention, the electric cable structural body may further include an insulating cover unit that covers a side of the intersection overlap portion that is opposite to an overlap side.

The expression the "side of the intersection overlap portion that is opposite to an overlap side" will be explained. In the case where, for example, the overlapping is performed in an up-down direction, the first direction exposed conductor group is located on the bottom side, and the second direction exposed conductor group is located on the top side. The first direction exposed conductor group and the second direction exposed conductor group are put to intersect and overlap each other in the up-down direction to form the intersection overlap portion. In this case, the "side of the intersection overlap portion that is opposite to an overlap side" refers to the side below the first direction exposed conductor group located on the bottom side and also to the side above the second direction exposed conductor group located on the top side. In other words, the "side of the intersection overlap portion that is opposite to an overlap side" refers to the outer side of the intersection overlap portion.

The "insulating cover unit" will be explained. For example, in the case where a plurality of rectangular conductors located parallel to each other are covered together with an insulating film, the "insulating cover unit" refers to such an insulating film. In the case where the intersection overlap portion is enclosed and held by an insulating holder, the "insulating cover unit" refers to such an insulating holder.

According to the present invention, the intersection overlap portion, in which desirable conductor intersection portions among the intersection portions are connected to be conductive to each other, are kept insulated and thus protected. Thus, the inconvenience such that the exposed conductor portions are inadvertently shortcircuited does not occur, and a desirable connection route is provided with certainty.

The insulating cover unit may be filled with a filler formed of an insulating synthetic resin or the like, so that the sealability against moisture is provided.

In an embodiment of the present invention, a plurality of the first direction exposed conductor groups may be provided in the longitudinal direction with an interval; and a plurality of the second direction exposed conductor groups may be provided to respectively overlap the plurality of the first direction exposed conductor groups extending in the longitudinal direction to provide a plurality of intersection overlap portions in the longitudinal direction.

According to the present invention, any of various connection routes are provided easily. This will be described in more detail. The plurality of intersection overlap portions are provided. In each of the intersection overlap portions, the desirable conductor intersection portions are connected to be conductive to each other. Owing to this, the desirable connection route, even when being complicated, is provided easily.

In an embodiment of the present invention, the electric cable structural body may be folded such that the plurality of intersection overlap portions are stacked in a stacking direction.

According to the present invention, the electric cable structural body allowing any of various connection routes to be provided easily may be made compact. Owing to this, electric cable structural body having a desirable complicated connection route may be located in a limited narrow area, and thus is usable for a wide variety of applications.

In an embodiment of the present invention, a plurality of the conductors may be rectangular conductors located with an interval provided in a width direction and may be held between insulating films to form a flat cable.

According to the present invention, even a complicated connection router is provided more efficiently.

This will be described in more detail. In the flat cable, a plurality of rectangular conductors are located parallel to each other with a predetermined interval. The insulating film is removed from a desirable portion extending in the longitudinal direction of the flat cable to exposed the plurality of conductors located parallel to each other. Thus, exposed conductor portions extending in the same direction with a predetermined interval are formed easily. The flat cables each having the insulating film removed from a predetermined portion are put to intersect and overlap each other. In this manner, the intersection overlap portion is easily provided.

In an embodiment of the present invention, a plurality of the conductors may be each covered with an insulating cover.

According to the present invention, the electric cable structural body is provided at low cost, which significantly reduces the cost.

In an embodiment of the present invention, a harness may be connected to at least one of the conductors included in the second direction exposed conductor group of the above-described electric cable structural body.

According to the present invention, the harness is connected with a desirable connection route in accordance with the type, grade or specifications of the vehicle. Owing to this, common harnesses are usable, which increases the productivity and further reduces the cost.

The present invention is directed to an electric cable structural body, including covered electric cables each including a conductor and an insulating cover that covers the conductor, the covered electric cables including first covered electric cables extending in a first direction and second covered electric cables extending in a second direction intersecting the first direction. The conductor of each of the first covered electric cables and the conductor of each of the second covered electric cables are joined together at an intersection portion thereof so as to be connected to be conductive to each other to form an intersecting electric cable group; and a plurality of the intersecting electric cable groups are located such that the first covered electric cables are parallel to each other and the second covered electric cables are parallel to each other to form an electric cable group intersection portion in which the first covered electric cables and the second covered electric cables intersect each other in the same plane.

According to the present invention, the first covered electric cables and the second covered electric cables are positionally arranged at the electric cable intersection portion easily and accurately to provide a desirable wiring pattern without a dedicated jig.

The number of the intersecting electric cable groups or the positional arrangement thereof may be changed appropriately, so that the electric cable structural body may be in a form suitable to any of various functions or installment locations. Therefore, common components are usable for the electric cable structural body.

Owing to this, the electric cable structural body is produced at lower cost and installed in a smaller space.

The plurality of intersecting electric cable groups that are formed into an integral body are provided as the electric cable group intersection portion. Therefore, the electric cable structural body has a higher reliability electrically.

According to the above-described structure, the intersection portion of the first covered electric cable and the second covered electric cable has a high level of integrity. Owing to this, the electric cable structural body is produced at lower cost and installed in a smaller space.

The conductor may be formed of a single wire, or a twisted cable formed of a plurality of wires. The twisted wire encompasses a twisted pair cable formed by twisting two covered electric cables. The conductor may be covered with a mesh-like metal material or a shielding member such as metal foil or the like to provide a core wire.

In the state where the plurality of intersecting electric cable groups are provided, the electric cable intersection portions, in which the covered electric cables that form a predetermined intersecting electric cable groups and the covered electric cables that form the other intersecting electric cable groups, may be in a conductive state or a non-conductive state.

In an embodiment of the present invention, the covered electric cables may each include one conductor.

According to the above-described structure, it is not necessary to provide a plurality of flat cables so as to intersect each other. A plurality of intersecting electric cable groups is merely located so as to provide a desirable wiring pattern. Thus, the first covered electric cables located parallel to each other, and the second covered electric cables located parallel to each other, are positionally arranged easily and accurately.

Therefore, the covered electric cables which cost less than the flat cables are usable to form the electric cable structural body. This significantly reduces the cost in the case where the number of the conductors is the same.

In an embodiment of the present invention, the plurality of the intersecting electric cable groups may each include the second covered electric cables intersecting the first covered electric cables; the second covered electric cables may be located with an interval provided in a longitudinal direction of the first covered electric cables; and the intersection portions of the first covered electric cables and the second covered electric cables may be in a conductive state.

According to the above-described structure, the plurality of electric cable intersection portions are provided, with an interval, in the longitudinal direction of the first covered electric cables, namely, the first direction. Owing to this, the electric cable structural body is allowed to have any of a more variety of wiring pattern.

In an embodiment of the present invention, the first covered electric cables may be cut at one position or a plurality of positions in the longitudinal direction.

In the case where the first covered electric cables are cut at one position or a plurality of positions in the longitudinal direction as described above, the first covered electric cables are put into a non-conductive state at the cut position(s). In accordance with at which position(s) the first covered electric cables are cut, any of a wide variety of wiring patterns is formed.

In an embodiment of the present invention, a plurality of electric cable intersection portions may be located in the longitudinal direction of the first covered electric cables, and the first covered electric cables may be folded in a hairpin turn manner such that the plurality of electric cable intersection portions are stacked in a thickness direction.

According to the above-described structure, an end portion of each of the plurality of covered electric cables located on the end side of the electric cable group intersection portions is usable as a connection terminal. A plurality of such connection terminals are located in a plane, instead of linearly along the first direction or the second direction. Therefore, the electric cable structural body is usable as a branch connection unit including a great number of connection terminals without requiring a large installation space.

The expression "folded in a hairpin turn manner" refers to that the first covered electric cables are folded zigzag.

The first covered electric cables are not limited to being folded in a hairpin turn manner. Alternatively, a plurality of electric cable group intersection portions may be formed separately and stacked in a plurality of layers, so that the conductors are made conductive between the layers. The length of each side of each electric cable group intersection portion corresponds to the length of each side of each electric cable group intersection portion provided in the case where the electric structural body is folded in a hairpin turn manner. There is no specific limitation on the manner of stacking the electric cable group intersection portions.

In an embodiment of the present invention, the electric cable structural body may further include an accommodation and holding unit that accommodates and holds each of the electric cable intersection portions.

According to the above-described structure, the electric cable group intersection portion is accommodated and held in the accommodation and holding unit. Owing to this, the plurality of first covered electric cables located parallel to each other and the plurality of second covered electric cables located parallel to each other are kept at a predetermined pitch and a predetermined angle.

The electric cable group intersection portion is accommodated and held in the accommodation and holding unit. Therefore, at the electric cable intersection portion where the conductors are joined together, the insulation between the conductors is guaranteed. As compared with the case where the accommodation and holding unit is not provided, the electrical characteristics are superior.

In an embodiment of the present invention, a harness may be connected to at least one of end portions of the second covered electric cables of the above-described electric cable structural body.

According to the above-described structure, the electric cable group intersection portion is accommodated and held in the accommodation and holding unit. Therefore, the electric cable structural body having a high reliability electrically is produced at lower cost and installed in a smaller space.

The present invention is directed to a method for producing an electric structural body in which covered electric cables each includes a conductor and an insulating cover that covers the conductor. The covered electric cables includes first covered electric cables extending in a first direction and second covered electric cables extending in a second direction intersecting the first direction. The method includes an insulating cover removing step of removing the insulating cover from a part in a longitudinal direction of each of the first covered electric cables that intersects the second covered electric cable, and removing the insulating cover from a part in a longitudinal direction of each of the second covered electric cables that intersects the first covered electric cable, to form conductor exposed portions; an intersection positional arrangement step of causing the first covered electric cables and the second covered electric cables to intersect each other such that the conductor exposed portions thereof are in contact with each other; a conductor joining step of joining together the conductor exposed portions of the first covered electric cables and the conductor exposed portions of the second covered electric cables to form intersecting electric cable groups, wherein in each of the intersecting electric cable groups, the intersection portion is a conductor intersection portion where the conductor of the first covered electric cable and the conductor of the second covered electric cable are conductive to each other, and the first covered electric cable and the second covered electric cable are connected to be conductive to each other at the conductor intersection portion; and an intersecting electric cable group positional arrangement step of locating the intersecting electric cable groups such that the first covered electric cables are parallel to each other and the second covered electric cables are parallel to each other, to form an electric cable group intersection portion in which the first covered electric cables and the second covered electric cables intersect each other in the same plane. The steps are performed in this order.

In the intersecting electric cable group positional arrangement step, the plurality of intersecting electric cable groups are merely located such that the first covered electric cables are parallel to each other and such that the second covered electric cables are parallel to each other in the electric cable group intersection portion. It is not needed to perform the insulating cover removal step or the conductor joining step in the intersecting electric cable group positional arrangement step.

Therefore, unlike in a conventional method by which the covered electric cables intersecting each other are joined together, there is no undesirable possibility that the pitch or angle of the plurality of covered electric cables located parallel to each other is shifted in the intersecting electric cable group positional arrangement step. The electric cable structural body is produced accurately and easily.

In an embodiment of the present invention, in the conductor joining step, laser may be directed toward a contact portion where the conductor exposed portions are in contact with each other via a gap between the insulating cover of each first covered electric cable and the insulating cover of each second covered electric cable.

According to the above-described structure, the conductor exposed portions are joined together at the contact portion to be conductive to each other by laser irradiation. Laser irradiation realizes strong joint with a high level of energy with pinpoint accuracy. Therefore, for joining the conductor of the of the first covered electric cable and the conductor of the second covered electric cable, it is not necessary to remove the insulating cover of each covered electric cable in a large area in the circumferential direction or in the longitudinal direction. Spot welding is made possible by the laser light passing the gap between the insulating covers of the covered electric cables. The gap has a minimum possible size which allows the laser light to pass.

Owing to this, strong joint is made possible by the laser light. In addition, the conductor exposed portions are protected against moisture. Thus, the inside of the covered electric cables is prevented against entrance of moisture via a gap between the conductors and the insulating covers. Therefore, high electric characteristics are provided.

In an embodiment of the present invention, in the conductor joining step, one of a positive electrode and a negative electrode may be put into contact with the conductive exposed portion of each first covered electric cable, and the other of the positive electrode and the negative electrode may be put into contact with the conductive exposed portion of each second covered electric cable, to supply an electric current, sufficiently large to weld the conductor exposed portions, between the positive electrode and the negative electrode.

According to the above-described structure, in the conductor joining step, one electrode is put into contact with the conductive exposed portion of each first covered electric cable, and the other electrode is put into contact with the conductive exposed portion of each second covered electric cable, to make the conductor exposed portions conductive to each other. Owing to this, the conductor exposed portions are more strongly welded by electric resistance welding by use of heat generated by the resistance of the conductor exposed portions.

The welding of the conductor exposed portions is not limited to being performed by the laser light or the electrodes as described above. The welding may be performed by application of a conductive adhesive, supersonic connection, soldering, or a combination thereof.

In an embodiment of the present invention, the method for producing an electric structural body may further include a hairpin turn step of folding the first covered electric cables in the longitudinal direction thereof such that the plurality of electric cable group intersection portions are stacked in a thickness direction, the hairpin turn step being performed after the intersecting electric cable group positional arrangement step.

According to the above-described production method, the hairpin turn step is performed. Owing to this, an end portion of each of the plurality of covered electric cables located on the end side of the electric cable group intersection portions is usable as a connection terminal. A plurality of such connection terminals are located in a plane, instead of linearly along the first direction or the second direction. Therefore, the electric cable structural body is usable as a branch connection unit including a great number of connection terminals without requiring a large installation space.

In an embodiment of the present invention, the method for producing an electric structural body may further include an electric cable accommodation unit accommodation step of causing each of the electric cable group intersection portions to be accommodated in an electric cable accommodation and holding unit, the electric cable accommodation unit accommodation step being performed after the intersecting electric cable group positional arrangement step.

The above-described electric cable accommodation unit accommodation step is performed. Therefore, the electric cable group intersection portion is accommodated and held in the accommodation and holding unit. Owing to this, the plurality of first covered electric cables located parallel to each other and the plurality of second covered electric cables located parallel to each other are kept at a predetermined pitch and a predetermined angle.

The electric cable group intersection portion is accommodated and held in the accommodation and holding unit. Owing to this, the electric cable intersection portion where the conductors are joined together is protected against moisture, and the insulation between the conductors is guaranteed. As compared with the case where the accommodation and holding unit is not provided, the electrical characteristics are superior.

Advantageous Effects of Invention

The present invention provides an electric cable structural body, an electric connection structure, and a method for producing an electric cable structural body, by which conductors at a desirable intersection portion, among intersection portions where conductors intersect each other in an overlapping manner, are connected to each other accurately and efficiently to provide a desirable connection route.

The present invention provides an electric cable structural body, by which a first covered electric cable and a second covered electric cable in an electric cable group intersection portion are positionally arranged easily and accurately so as to provide a desirable wiring pattern with no use of a dedicated jig.

BRIEF DESCRIPTION OF DRAWINGS

FIG. 3 is an isometric view showing an intersection insulating film located between exposed conductor groups and.

DESCRIPTION OF EMBODIMENTS

Hereinafter, an embodiment of the present invention will be described with reference to the drawings.

Example 1

Figure 1:
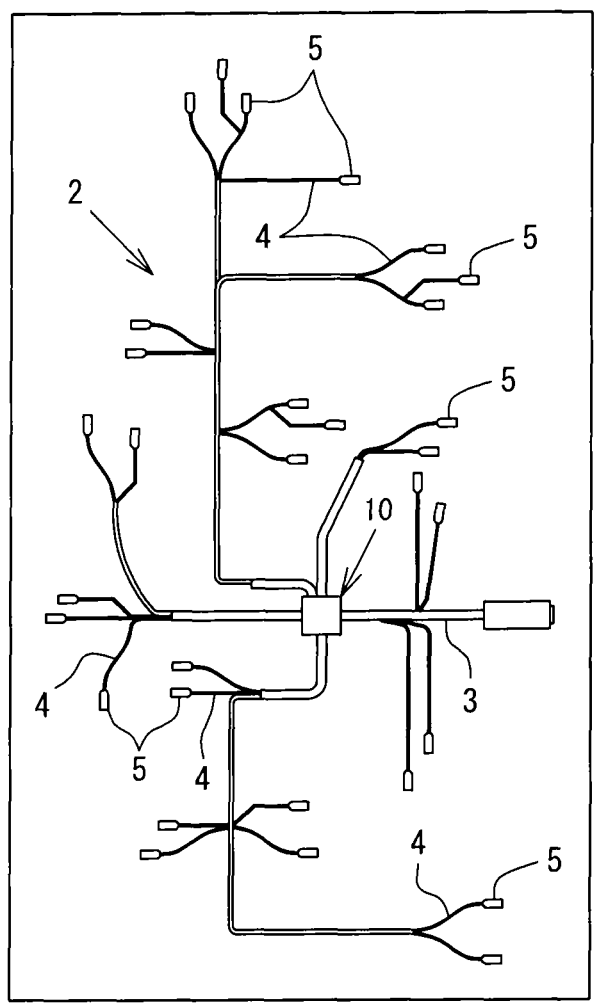
FIG. 1 is a plan of a wiring example using an electric cable structural body in example 1.
Figure 2:
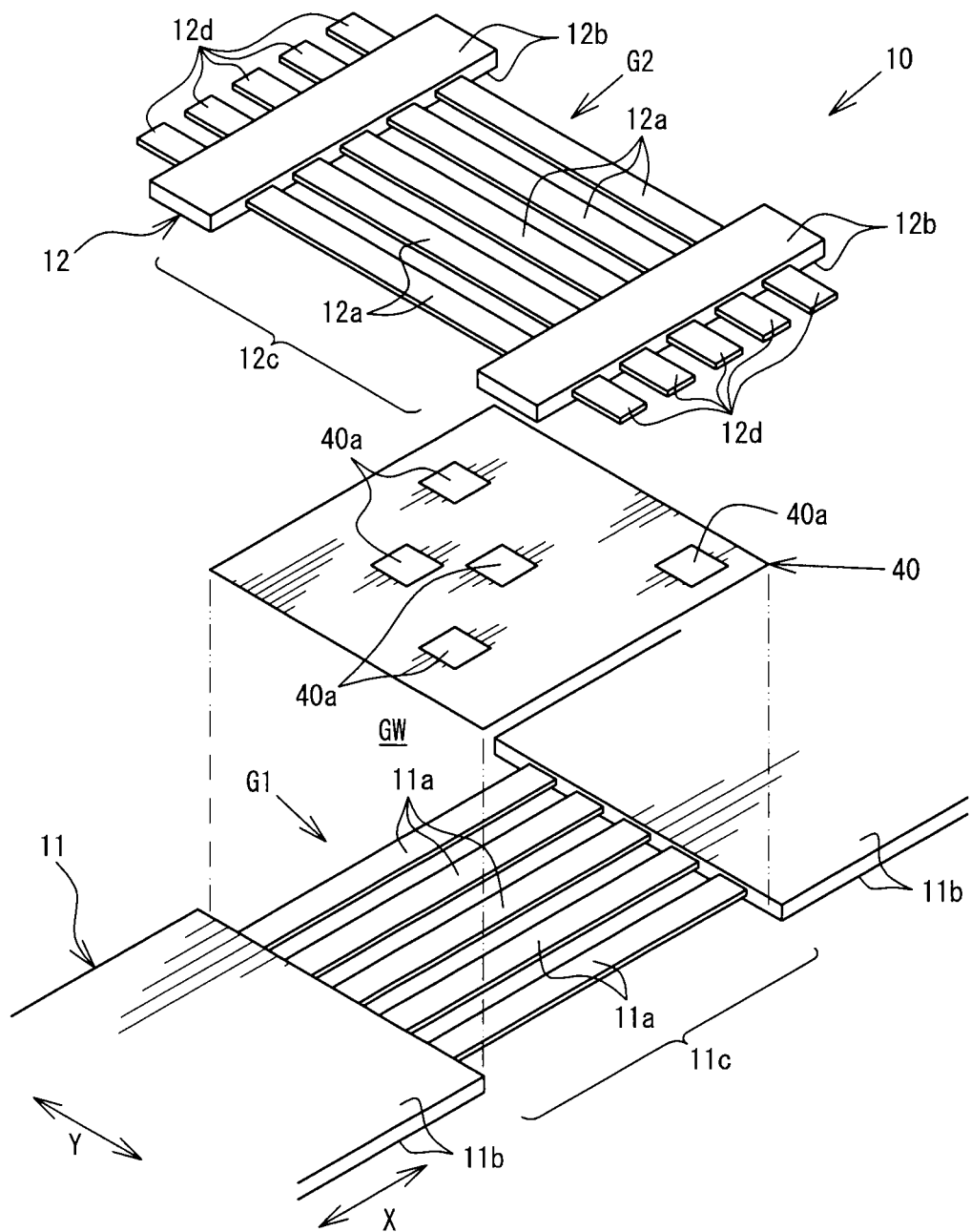
FIG. 2 is an isometric view showing how components of the electric cable structural body are stacked.
Figure 3:
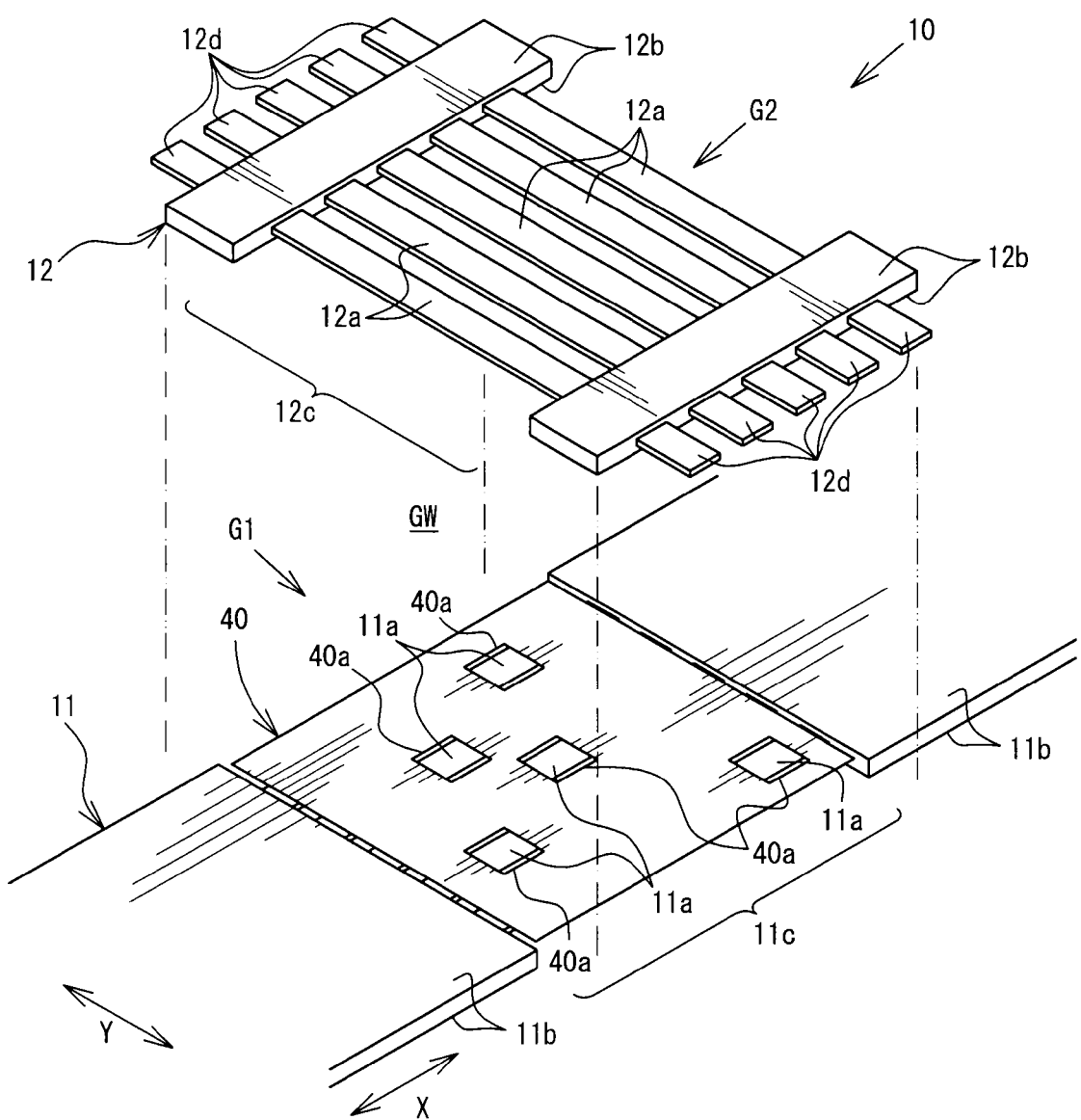
Figure 4:
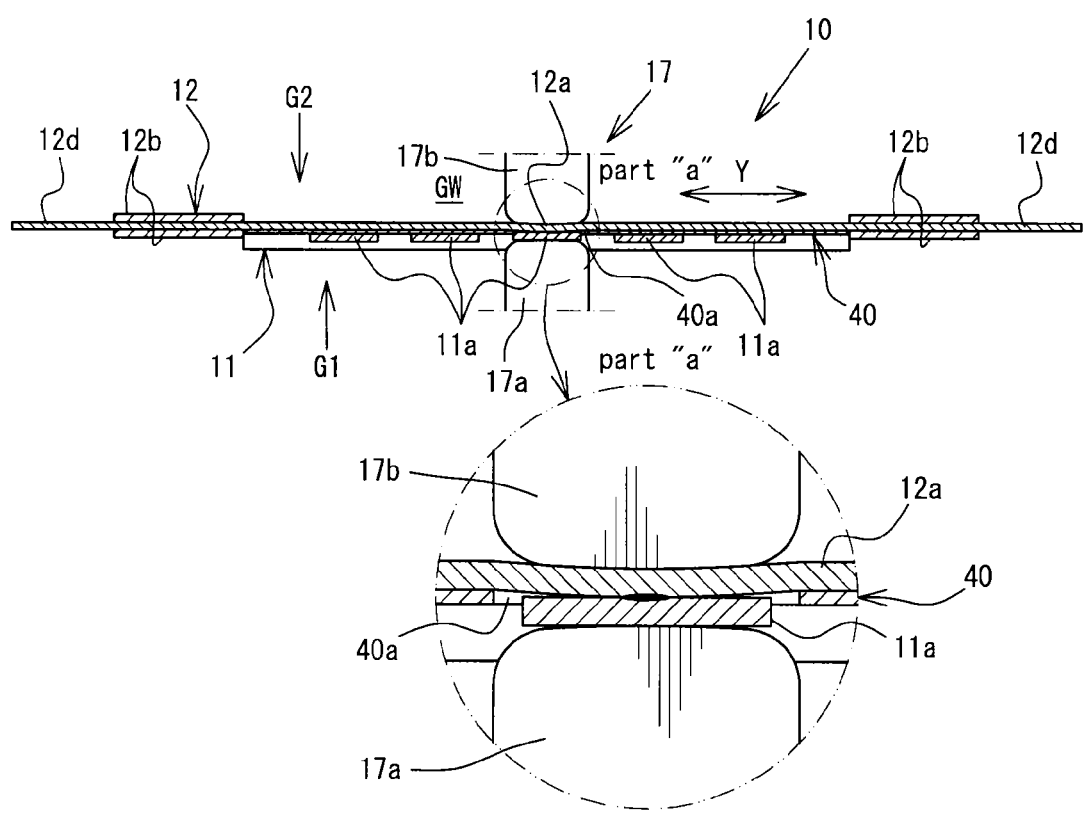
FIG. 4 shows a rectangular conductors welded at an intersection portion thereof by electric resistance welding.
Figure 5:
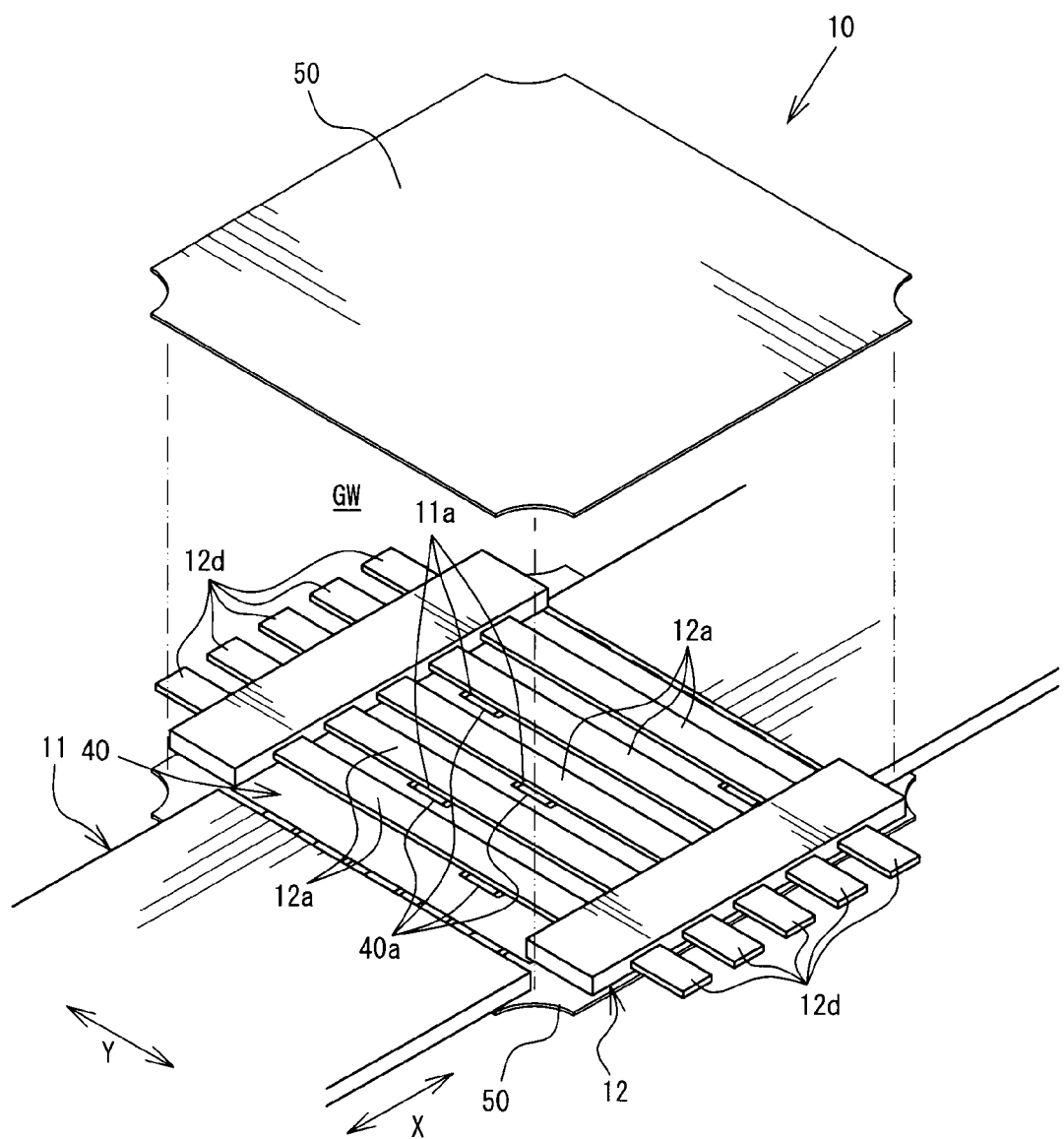
FIG. 5 is an isometric view showing a pair of outer insulating films covering an intersection overlap portion.
Figure 6:
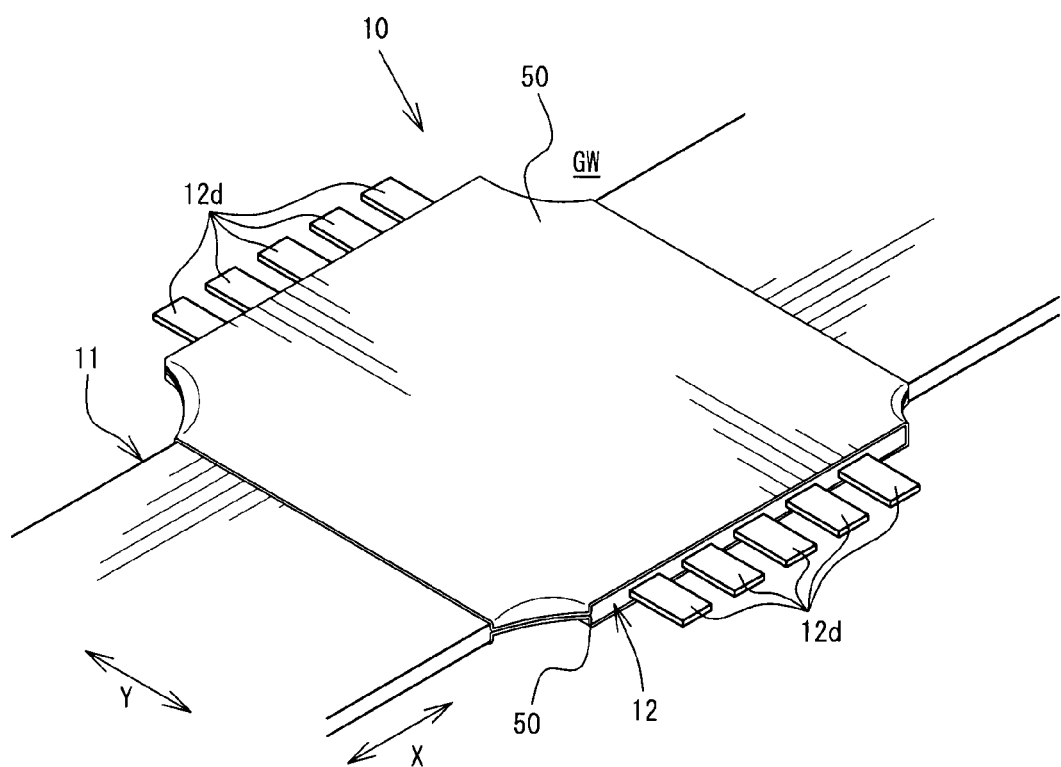
FIG. 6 is an isometric view of the electric cable structural body including the outer insulating films.
Figure 7:
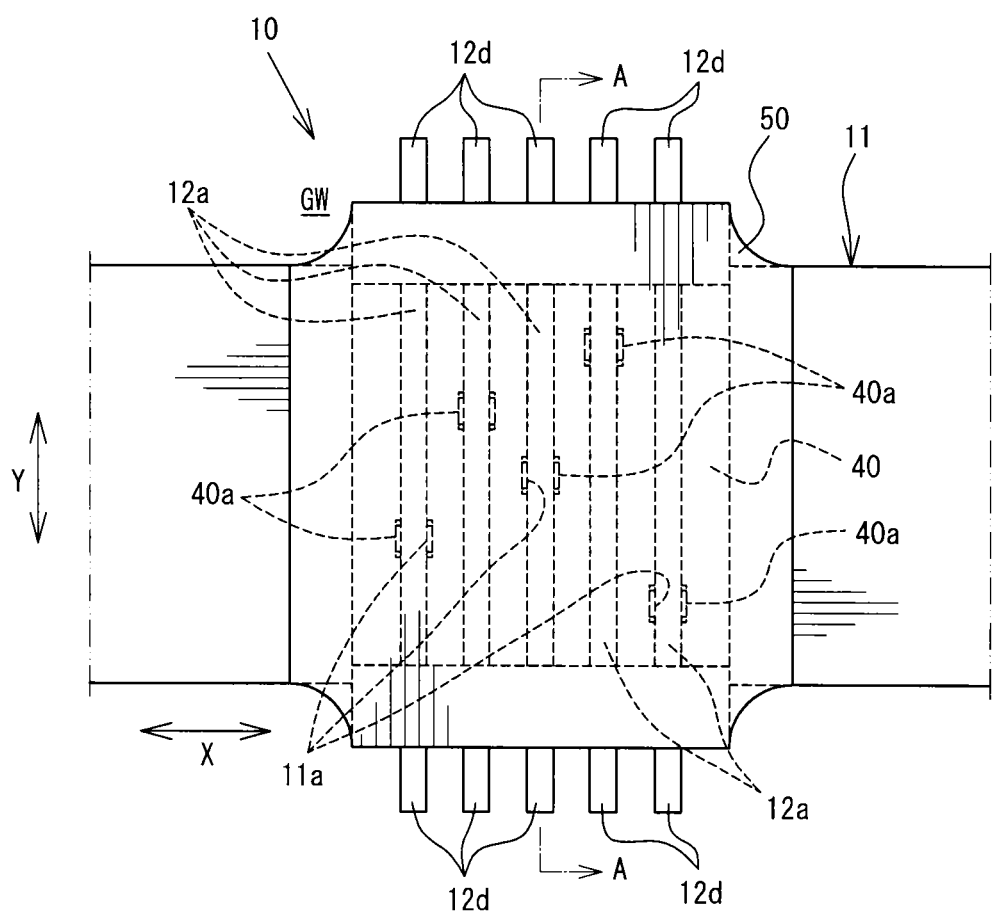
FIG. 7 is a plan view of the electric cable structural body including the outer insulating films.
Figure 8:
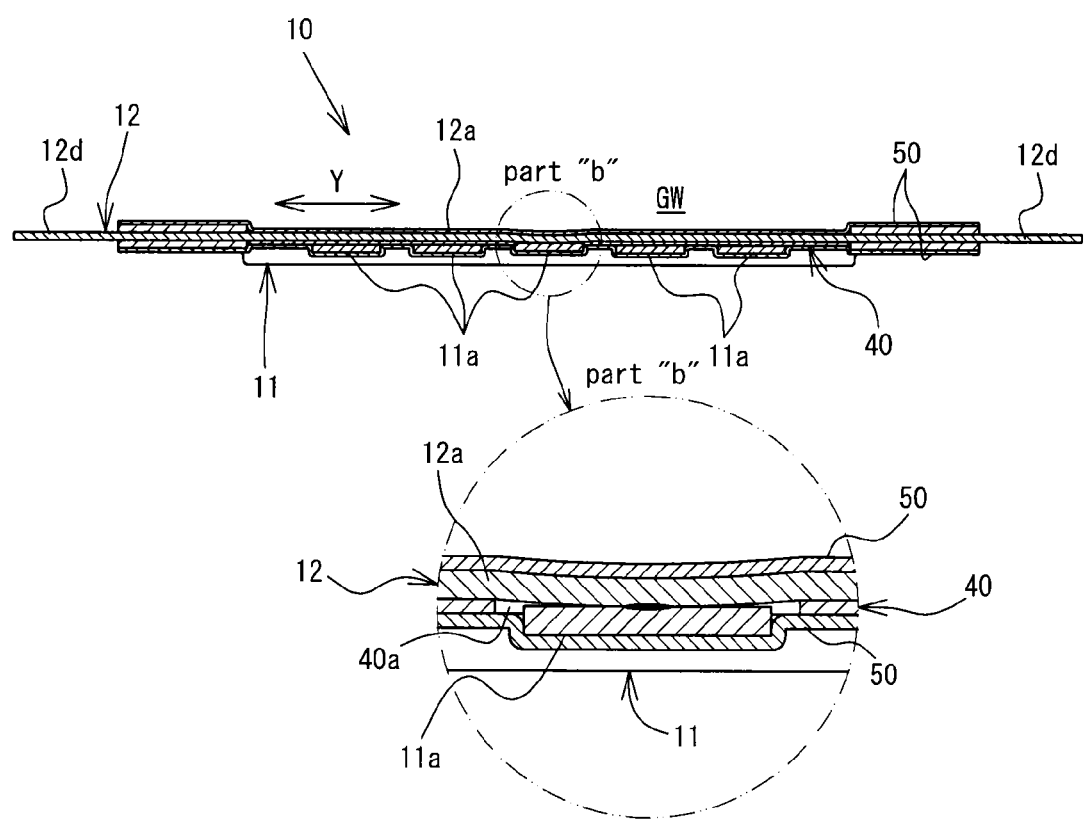
FIG. 8 is a cross-sectional view of the electric cable structural body including the outer insulating films taken along line A-A.

FIG. 1 is a plan view of a wiring example using an electric cable structural body 10 in example 1. FIG. 2 is an isometric view showing how components of the electric cable structural body 10 are stacked. FIG. 3 is an isometric view showing an intersection insulating film 40 located between exposed conductor groups G1 and G2. FIG. 4 shows a rectangular conductor 11a and a rectangular conductor 12a welded at an intersection portion thereof by electric resistance welding. FIG. 5 is an isometric view showing a pair of outer insulating films 50 covering an intersection overlap portion GW. FIG. 6 is an isometric view of the electric cable structural body 10 including the outer insulating films 50. FIG. 7 is a plan view of the electric cable structural body 10 including the outer insulating films 50. FIG. 8 is a cross-sectional view of the electric cable structural body 10 including the outer insulating films 50 taken along line A-A.

Figure 9:
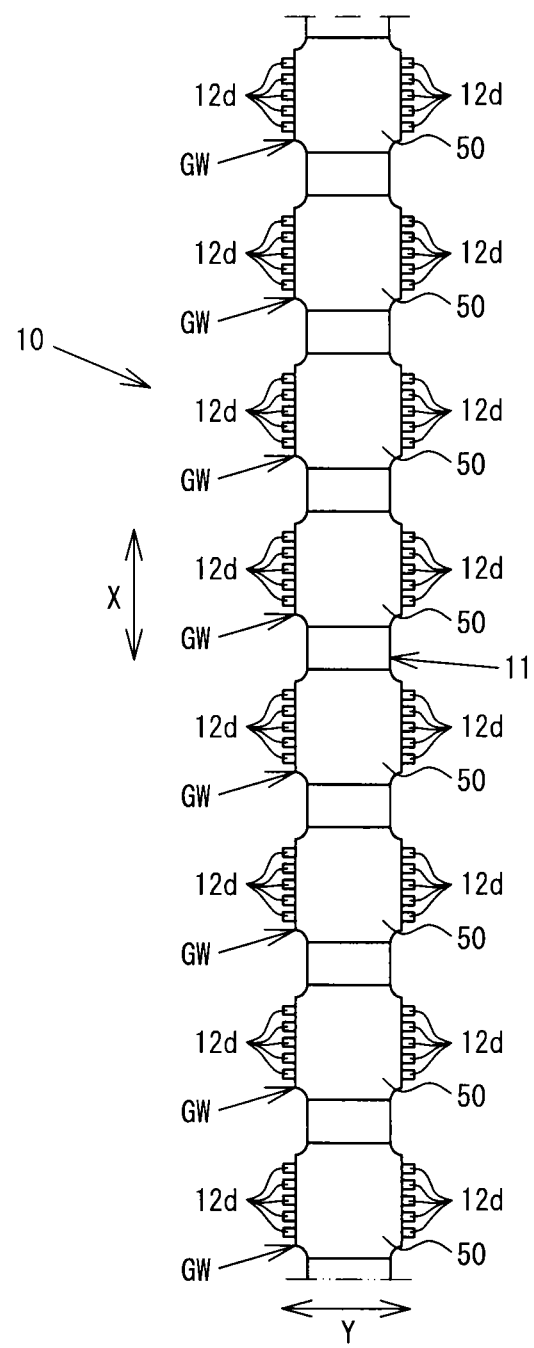
FIG. 9 is a plan view of the electric cable structural body including the intersection overlap portions located in a first direction.
Figure 10:
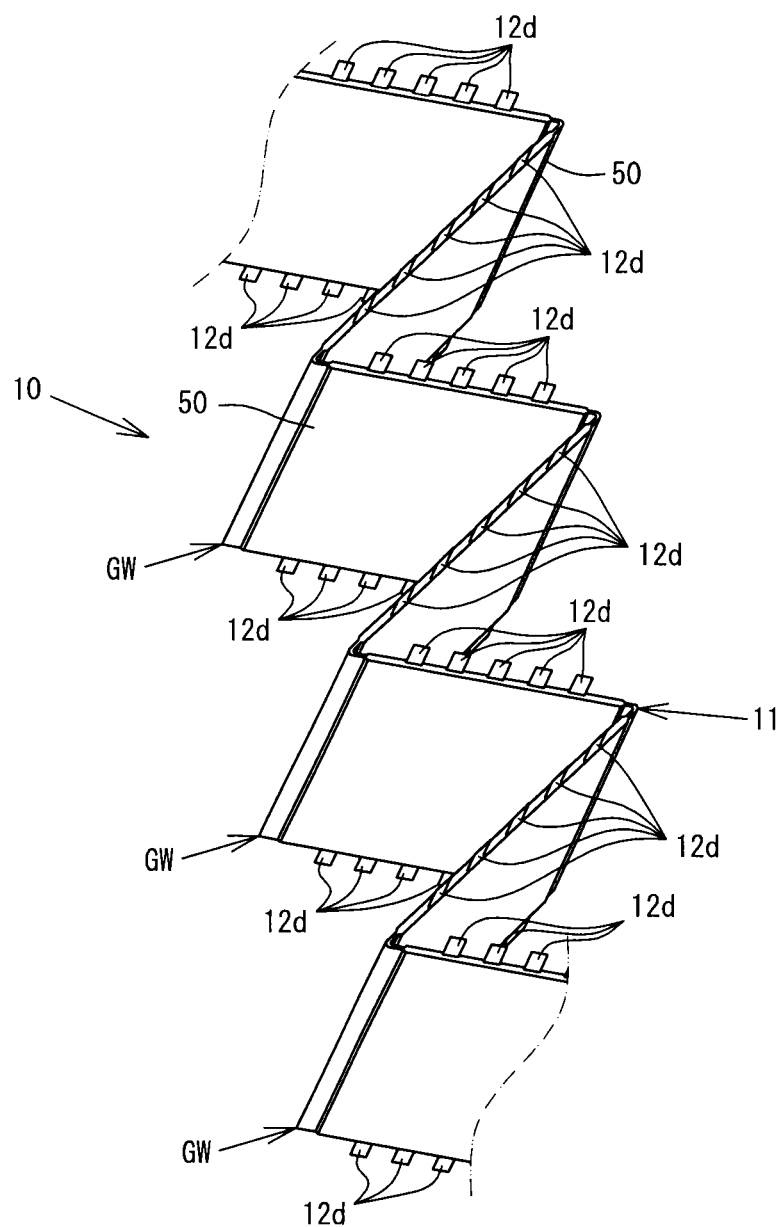
FIG. 10 shows how the electric cable structural body shown in FIG. 9 is folded in a hairpin turn manner.
Figure 11:
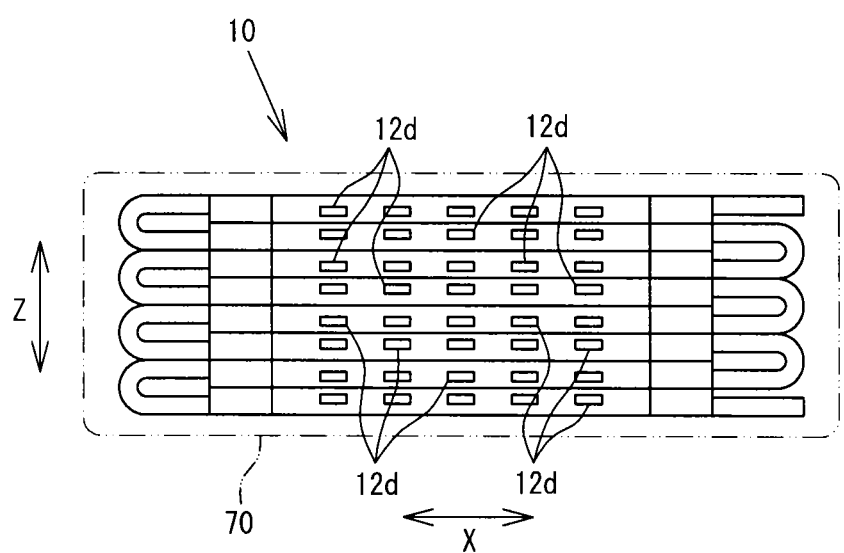
FIG. 11 is a side view of the electric cable structural body shown in FIG. 9 folded in a hairpin turn manner and stacked.
Figure 12:
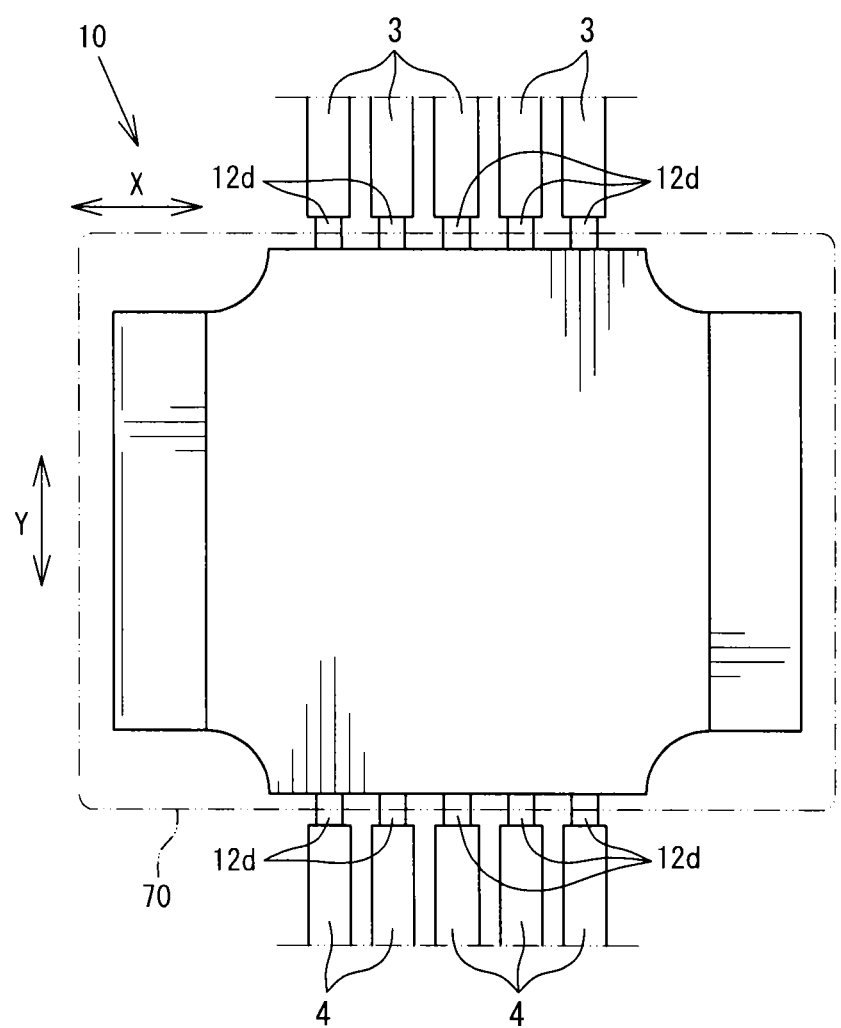
FIG. 12 is a plan view of the electric cable structural body connected with harnesses.

FIG. 9 is a plan view of the electric cable structural body 10 including a plurality of intersection overlap portions GW located in a first direction X. FIG. 10 shows how the electric cable structural body 10 shown in FIG. 9 is folded in a hairpin turn manner. FIG. 11 is a side view of the electric cable structural body 10 shown in FIG. 9 folded in a hairpin turn manner and stacked. FIG. 12 is a plan view of the electric cable structural body 10 connected with harnesses 3 and 4.

In a vehicle such an automobile or the like, a wire harness 2 mutually connecting a power source, a control device such as an ECU (Engine Control Unit) and an electric device such as an audio device, a direction indicator or the like includes, as shown in FIG. 1, a backbone harness 3 connected with the power source or the control device, branch harnesses 4 each branched from the backbone harness 3 and connected, at an end thereof, to each of electric devices, and the electric cable structural body 10 connecting the backbone harness 3 and the branch harness 4 to each other.

With reference to FIG. 2 through FIG. 9, the electric cable structural body 10 used to connect the backbone harness 3 and the branch harness 4 to each other as described above will be described in detail.

In example 1, the electric cable structural body 10 a first flat cable 11 extending in the first direction X (longitudinal direction), a second flat cable 12 extending in a second direction Y (width direction) intersecting the first flat cable 11, the intersection insulating film 40 held between the first flat cable 11 and the second flat cable 12 at an intersection thereof, and the pair of outer insulating films 50 located so as to cover the entirety of the intersection (see FIG. 2 through FIG. 5).

The first flat cable 11 includes five rectangular conductors 11a extending in the first direction X while being parallel in the second direction Y with a gap therebetween. The rectangular conductors 11a located parallel to each other are held between a pair of insulating covers 11b located above and below the rectangular conductors 11a. The five rectangular conductors 11a and the pair of insulating covers 11b are integrated together to form the first flat cable 11.

The first flat cable 11 includes a plurality of exposed conductor portions 11c formed at a predetermined position in the first direction X with a predetermined interval. The exposed conductor portions 11c are formed by removing a predetermined length of the insulating covers 11b by laser light irradiation to expose the rectangular conductors 11a.

The exposed conductor portions 11c formed by removing the predetermined length of the insulating covers 11b form a first direction exposed conductor group G1. Namely, the first direction exposed conductor group G1 includes the exposed conductor portions 11c extending in the first direction X while being parallel to each other.

The second flat cable 12 includes rectangular conductors 12a of the same number as that of the rectangular conductors 11a. The rectangular conductors 12a extend in the second direction Y while being parallel in the first direction X with a gap therebetween. The rectangular conductors 12a located parallel to each other are held between a pair of insulating covers 12b located above and below the rectangular conductors 12a. The rectangular conductors 12a and the pair of insulating covers 12b are integrated together to form the second flat cable 12.

The second flat cable 12 includes exposed conductor portions 12c formed in a central portion thereof. The exposed conductor portions 12c are formed by removing a predetermined length of the insulating covers 12b by laser light irradiation to expose the rectangular conductors 12a. The predetermined length of the insulating covers 12b corresponds to the width of the first flat cable 11, and thus the exposed conductor portions 12c have a length corresponding to the width of the first flat cable 11.

The exposed conductor portions 12c of the rectangular conductors 12a exposed by removing the predetermined length of the insulating covers 12b form a second direction exposed conductor group G2. Namely, the second direction exposed conductor group G2 includes the exposed conductor portions 12c extending in the second direction Y while being parallel to each other.

At each of two end portions of the second flat cable 12, terminal portions 12d connectable to the harness 3 or 4 are formed. The terminal portions 12d are formed by removing, by laser light irradiation, a part of the insulating covers 12b that protrudes from a corresponding end of the first flat cable 11 in the width direction to expose end portions of the rectangular conductors 12a.

The first direction exposed conductor group G1 including the plurality of exposed conductor portions 11c of the first flat cable 11 extending in the first direction X while being parallel to each other, and the second direction exposed conductor group G2 including the plurality of exposed conductor portions 12c of the second flat cable 12 extending in the second direction Y while being parallel to each other, intersect each other perpendicularly and also overlap each other in an up-down direction to form the intersection overlap portion GW.

Between the first direction exposed conductor group G1 and the second direction exposed conductor group G2 of the intersection overlap portion GW, the intersection insulating film 40 is located to electrically insulating the exposed conductor portions 11c and the exposed conductor portions 12c from each other.

The intersection insulating film 40 provided at the intersection of the exposed conductor portions 11c and 12c has a plurality of windows 40a at positions corresponding to conductor intersection portions where the exposed conductor portions 11c and the exposed conductor portions 12c are to be conductive to each other. The windows 40a runs through the intersection insulating film 40 in a thickness direction thereof, such that the rectangular conductors 11a and the rectangular conductors 12a intersecting each other face each other (see FIG. 2 through FIG. 4).

The exposed conductor portions 11c and the exposed conductor portions 12c facing each other are connected with each other via the windows 40a so as to be conductive to each other.

The windows 40a are located at positions corresponding to desirable conductor intersection portions in accordance with the specifications of the type or grade of the vehicle.

Now, with reference to FIG. 2 through FIG. 10, a method for producing the electric cable structural body 10 described above will be described.

First, the insulating films 11b of the first flat cable 11 are irradiated with laser light to remove a predetermined length thereof extending in the first direction X. As a result, the rectangular conductors 11a are partially exposed to form the exposed conductors 11c.

The insulating films 12b in the central portion of the second flat cable 12 are irradiated with laser light to remove a predetermined length thereof extending in the second direction Y. As a result, the rectangular conductors 12a are partially exposed by a length corresponding to the width of the first flat cable 11 to form the exposed conductors 12c. The "predetermined length" is slightly longer than the maximum width of the total of the five rectangular conductors 11a of the first flat cable 11 located parallel to each other.

In addition, the insulating films 12b of the second flat cable 12 are irradiated with laser light to remove the two end portions thereof protruding outward from the ends of the first flat cable 11 in the width direction. As a result, the rectangular conductors 12a are exposed in the end portions to form the terminal portions 12d (see FIG. 2).

Next, the first direction exposed conductor group G1 including the plurality of exposed conductor portions 11c extending in the first direction X while being parallel to each other, and the second direction exposed conductor group G2 including the plurality of exposed conductor portions 12c extending in the second direction Y while being parallel to each other, are put to overlap each other while intersecting each other perpendicularly. At this point, the intersection insulating film 40 is located between the first direction exposed conductor group G1 and the second direction exposed conductor group G2, at a position where the first direction exposed conductor group G1 and the second direction exposed conductor group G2 intersect each other. As a result, the intersection overlap portion GW is formed.

The exposed conductor portion 11c of the rectangular conductors 11a, and the exposed conductor portion 12c of the rectangular conductors 12a, are caused to face each other while having the windows 40a of the intersection insulating film 40 therebetween (see FIG. 3). Then, an electrode 17a and an electrode 17b of an electric resistance welding device 17 are moved into the intersection overlap portion GW including the first direction exposed conductor group G1 and the second direction exposed conductor group G2 intersecting each other. The electrode 17a is pressed from below to each of the conductor intersection portions at which a rectangular conductors 11a intersects a corresponding rectangular conductor 12a. The electrode 17b is pressed from above to each of the conductor intersection portions at which each rectangular conductors 12a intersects a corresponding rectangular conductor 11a (see FIG. 4).

As a result, the rectangular conductors 11a and the rectangular conductors 12a are put into contact with each other only at the conductor intersection portions corresponding to the windows 40a of the intersection insulating film 40. In the remaining portions, the rectangular conductors 11a and the rectangular conductors 12a are kept insulated from each other by the intersection insulating film 40.

Next, an electric current is supplied between the electrodes 17a and 17b from an electric current supply device to generate power having a temperature that is sufficiently high to melt the rectangular conductors 11a and 12a at the conductor intersection portions. As a result, the rectangular conductors 11a and 12a are welded to be conductive to each other at the conductor intersection portions (see enlarged view of part "a" in FIG. 4).

In this manner, the rectangular conductors 11a of the first direction exposed conductor group G1 and the rectangular conductors 12a of the second direction exposed conductor group G2 are welded at the conductor intersection portions by electric resistance welding in a good state with certainty.

After the welding is performed by electric resistance welding as described above, the electrodes 17a and 17b of the electric resistance welding device 17 are separated from the rectangular conductors 11a and the rectangular conductors 12a and moved out of the intersection overlap portion GW. Thus, the welding work is completed.

Next, the pair of outer insulating films 50 are put to cover the entirety of the intersection overlap portion GW, of the first direction exposed conductor group G1 and the second direction exposed conductor group G2, from above and below (see FIG. 5). Then, the pair of outer insulating films 50 covering the intersection overlap portion GW are heated and welded by a heating unit (not shown) to be in close contact with the intersection overlap portion GW and also to weld together edges of the outer insulating films 50 facing each other (see FIG. 6, FIG. 7 and FIG. 8).

In this manner, the pair of outer insulating films 50 are in close contact with the intersection overlap portion GW. Therefore, the intersection overlap portion GW is prevented against entrance of moisture and thus has a necessary level of sealability against water.

In addition, the intersection overlap portion GW is protected in an insulated state. Therefore, an inconvenience such that the exposed conductor portions 11c and 12c are inadvertently shortcircuited does not occur, and a desirable connection route is provided with certainty.

A plurality of the intersection overlap portions GW having a front surface and a rear surface covered with the outer insulating films 50 are formed at a predetermined interval provided in the first direction X in which the first flat cable 11 extends (see FIG. 9). Then, the resultant assembly is folded along an intermediate line between each two adjacent intersection overlap portions GW in a hairpin turn manner, so that the insulating surfaces of each adjacent intersection overlap portion GW are in contact with each other. As a result, the electric cable structural body 10 including the plurality of intersection overlap portions GW stacked in a stacking direction Z is formed (see FIG. 10 and FIG. 11).

For using the electric cable structural body 10 described above to connect the backbone harnesses 3 and the branch harnesses 4, the terminal portions 12d protruding on one side are connected with the backbone harnesses 3 whereas the portions 12d protruding on the other side are connected with the branch harnesses 4 (see FIG. 1 and FIG. 12). In this manner, the backbone harnesses 3 and the branch harnesses 4 are connected with a desirable connection route in accordance with the type or grade of the vehicle. Therefore, the backbone harnesses 3 and the branch harnesses 4 in the electric connection structure may be made to have common specifications, which increases the productivity and further reduces the cost.

The electric cable structural body 10 may be accommodated and held in an insulating case 70 shown in FIG. 10, FIG. 11 and FIG. 12 with the phantom line, so that the electric cable structural body 10 is more insulating and sealable against water with more certainty.

In the plurality of intersection overlap portions GW, the first direction exposed conductor group G1 and the second direction exposed conductor group G2 may be connected so as to be conductive to each other at desirable conductor intersection portions. In this case, the desirable connection route, even when being complicated, is provided easily.

As described above, the intersection insulating film 40, having the windows 40a at positions corresponding to the desirable conductor intersection portions in accordance with the type or grade of the vehicle, is merely located between the first direction exposed conductor group G1 and the second direction exposed conductor group G2 of the intersection overlap portions GW. Owing to this, the exposed conductor portions 11c and the exposed conductor portions 12c are connected to be conductive to each other at the conductor intersection portions via the windows 40a of the intersection insulating film 40 in the state where the rectangular conductors 11a and the rectangular conductors 12a are insulated from each other with certainty in the portions other than the conductor intersection portions.

Owing to this, the rectangular conductors are connected with each other only at the conductor intersection portions with certainly to provide a desirable connection route. For example, it is not necessary to search for the conductor intersection portions while checking with the specifications or the like. No error occurs in the intersection portions to be connected. Neither a long time nor many steps are needed to connect crimp terminals at the intersection portions.

In addition, the number of components such as crimp terminals or the like is not increased in accordance with the number of the conductor intersection portions. This increases the production efficiency and sufficiently reduces the cost.

Therefore, all the components may have common specifications other than the intersection insulating films 40, which have the windows 40a at the positions corresponding to the desirable conductor intersection portions in accordance with the type or grade of the vehicle. Use of such common specifications reduces the cost.

In the case where, for example, the conductors are connected to be conductive to each other by crimp terminals, an inconvenience may occur such that the crimp terminals come off by vibration and the conductivity is not maintained. According to the present invention, such an inconvenience does not occur. The conductivity at the conductor intersection portions and the insulating property in the remaining portion are stably maintained.

The plurality of rectangular conductors 11a of the first flat cable 11 are located parallel to each other via a predetermined interval, and the plurality of rectangular conductors 12a of the second flat cable 12 are also located parallel to each other via a predetermined interval. Therefore, the insulating covers 11b and 12b may merely removed at desirable positions in the first direction X to expose the plurality of rectangular conductors 11a and 12a each located parallel to each other, so that the exposed conductor portions 11c extending in the same direction while having a predetermined interval, and the exposed conductor portions 12c also extending in the same direction while having a predetermined interval, are formed easily.

Therefore, the flat cables 11 and 12 deprived of the insulating covers 11b and 12b at predetermined positions may be put to intersect and overlap each other, so that the intersection overlap portion GW is formed easily.

The intersection overlap portions GW are stacked in the stacking direction Z form the electric cable structural body 10. Therefore, the electric cable structural body 10 having any of various connection routes may be made compact. The electric cable structural body 10 having a desirable complicated connection route may be located in a limited narrow area, and thus is usable for a wide variety of applications.

In example 1 described above, the intersection overlap portions GW each having the front surface and the rear surface covered with the outer insulating films 50 are folded in a hairpin turn manner to overlap each other, and thus the electric cable structural body 10 is formed. Another example in which an insulating surface and a non-insulating surface of the intersection overlap portions GW located in the first direction X are stacked to form an electric cable structural body 10 will be described with reference to FIG. 13 and FIG. 14.

Figure 13:
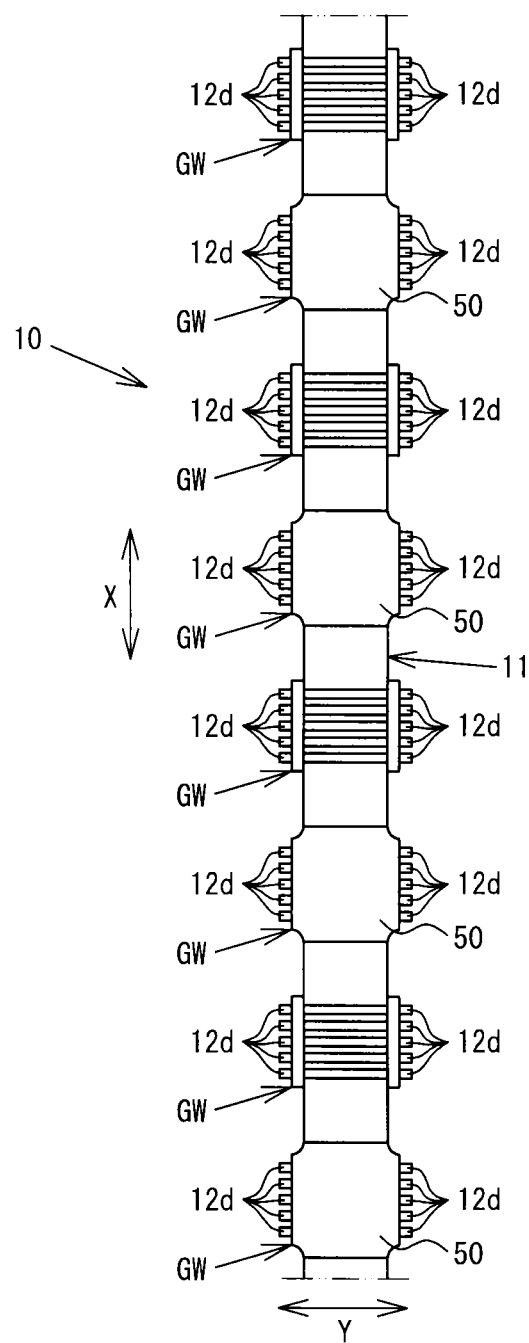
FIG. 13 is a plan view of the electric cable structural body having one surface covered with the outer insulating film.
Figure 14:
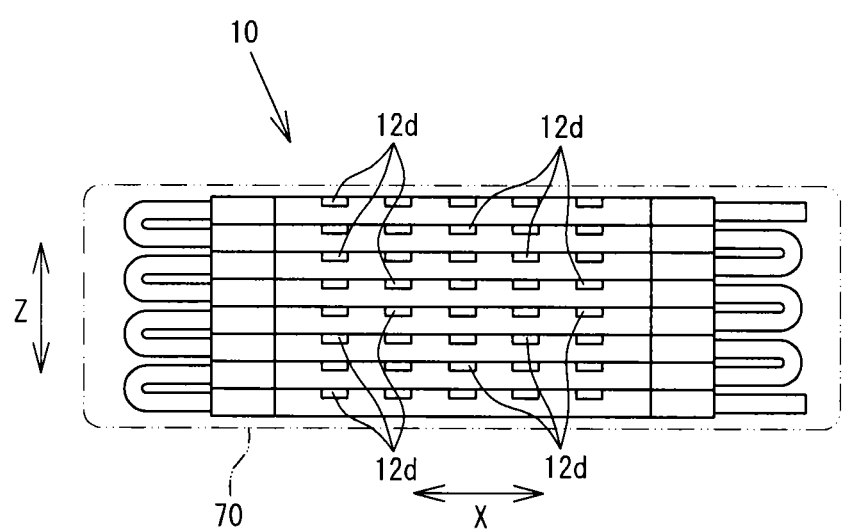
FIG. 14 is a side view of the electric cable structural body shown in FIG. 13 folded in a hairpin turn manner and stacked.

FIG. 13 is a plan view of the electric cable structural body 10 in which one surface of each intersection overlap portion GW is covered with the outer insulating film 50. FIG. 14 is a side view of the electric cable structural body 10 including the intersection overlap portions GW are folded in a hairpin turn manner and stacked.

The intersection overlap portions GW are folded in a hairpin turn manner such that an insulating surface of an intersection overlap portion GW covered with the outer insulating film 50, and a non-insulating surface of another intersection overlap portion GW not covered with the outer insulating film 50, face each other. Then, the intersection overlap portions GW are stacked in the stacking direction Z to form the electric cable structural body 10 having a three-dimensional shape.

The insulating surface of an intersection overlap portion GW covered with the outer insulating film 50, and a non-insulating surface of another intersection overlap portion GW not covered with the outer insulating film 50, are put to face each other, and thus the surfaces are insulated from each other. Therefore, the production cost of the electric cable structural body 10 is reduced as compared with the case where both of the front surface and the rear surface of each intersection overlap portion GW are covered with the outer insulating films 50. In addition, the outer insulating film 50 merely needs to be provided on either one of the front surface and the rear surface of each intersection overlap portion GW. Therefore, the electric cable structural body 10 may be more lightweight and thinner by the number of the outer insulating films 50.

Example 2

Next, an electric cable structural body 20 in example 2 will be described with reference to FIG. 15 through FIG. 21. In example 1, the first flat cable 11 and the second flat cable 12 are used. In example 2, a first covered electric cable 21 including a first round conductor 21a and an insulating cover 21b covering the first round conductor 21a, and a second covered electric cable 22 including a second round conductor 22a and an insulating cover 22b covering the first round conductor 21a, are used.

Figure 15:
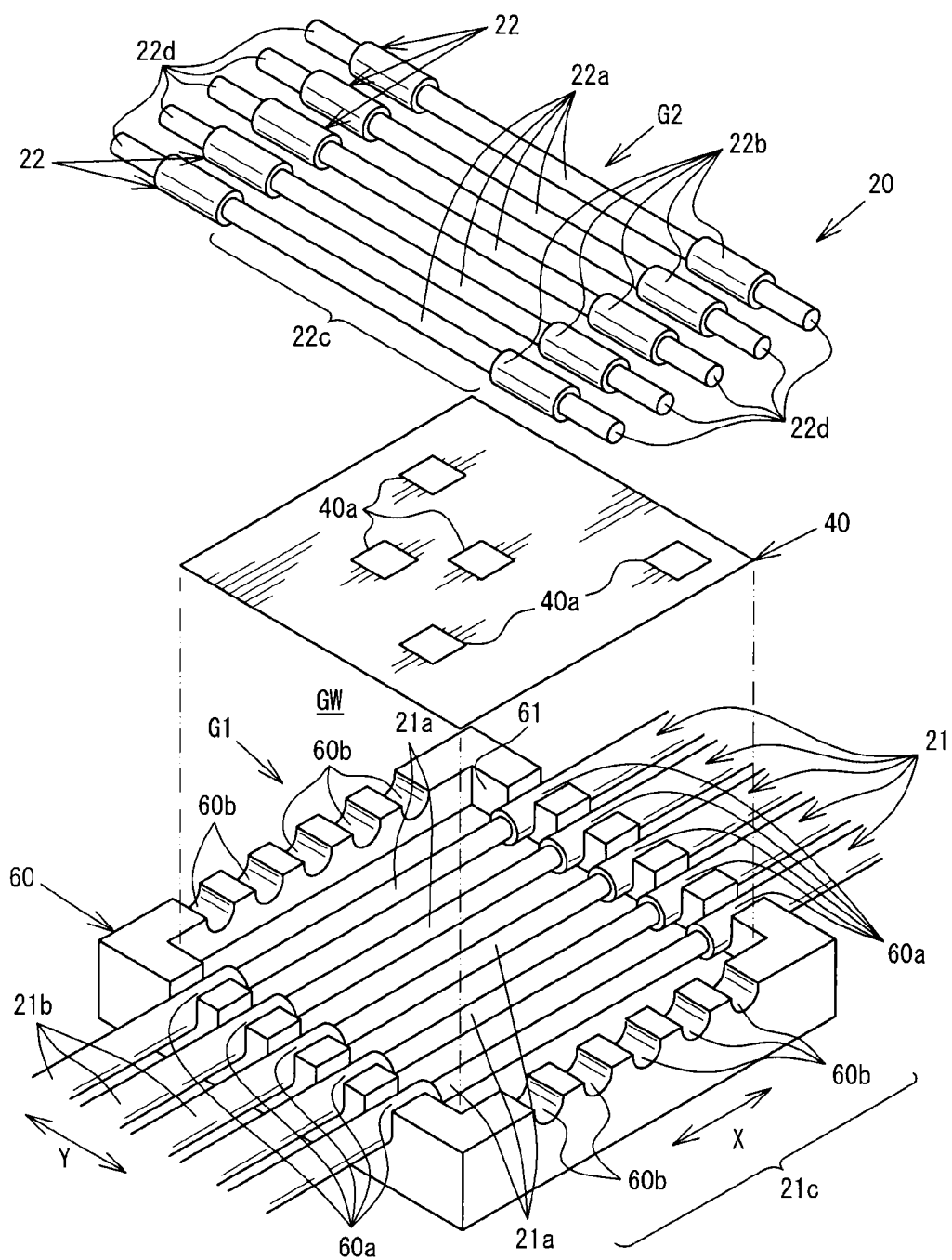
FIG. 15 is an isometric view showing how components of an electric cable structural body in example 2 are stacked.
Figure 16:
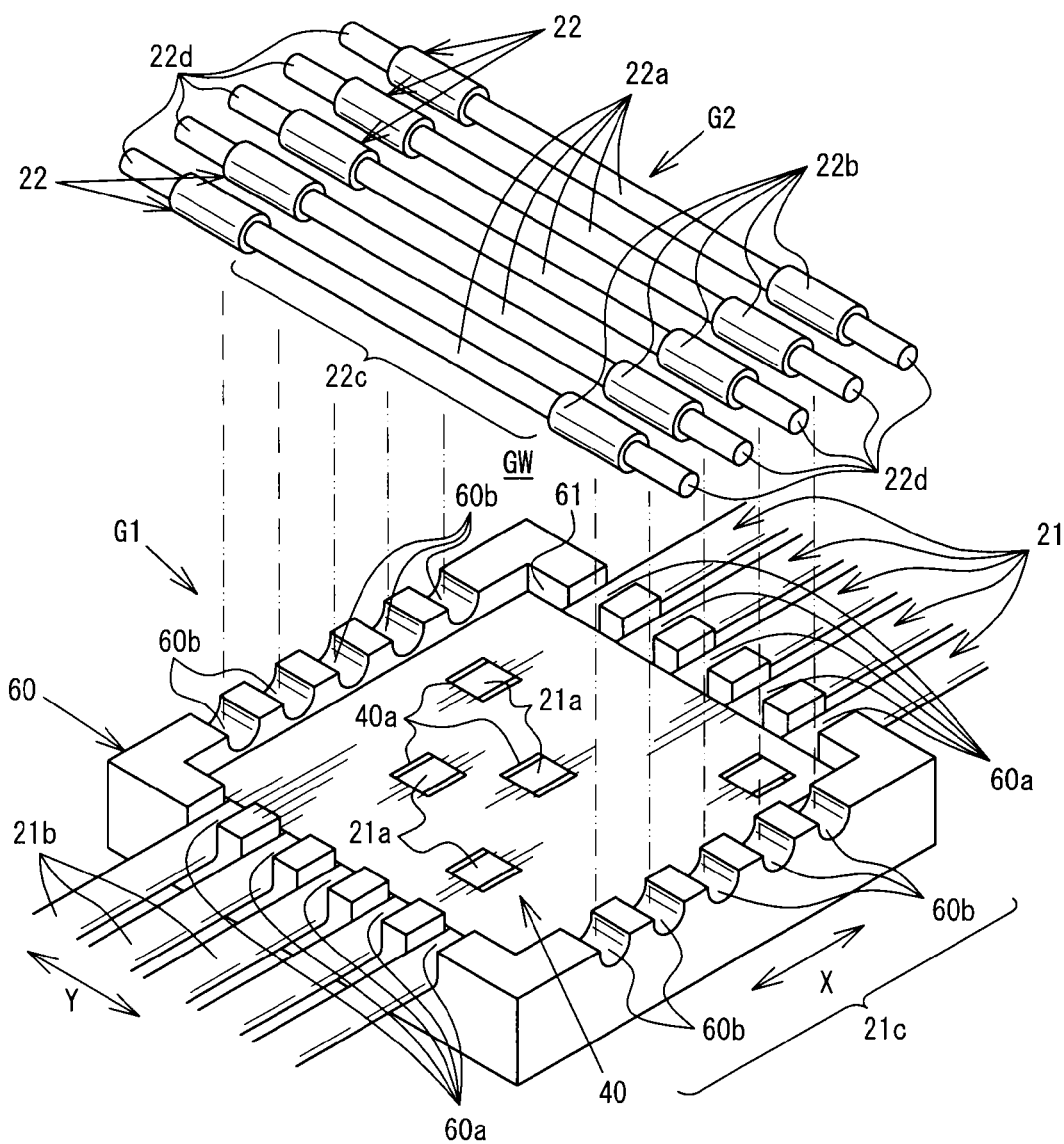
FIG. 16 is an isometric view showing an intersection insulating film located between exposed conductor groups.
Figure 17:
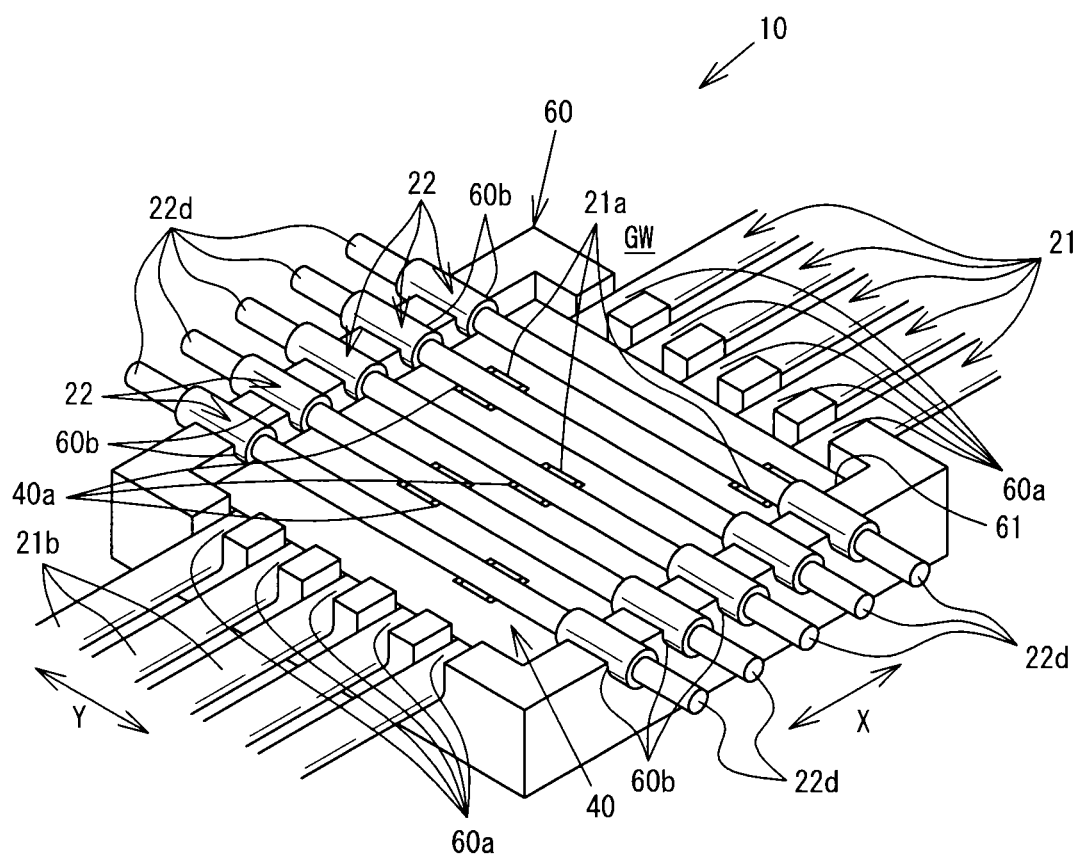
FIG. 17 is an isometric view of the electric cable structural body having one surface covered with an insulating holder.
Figure 18:
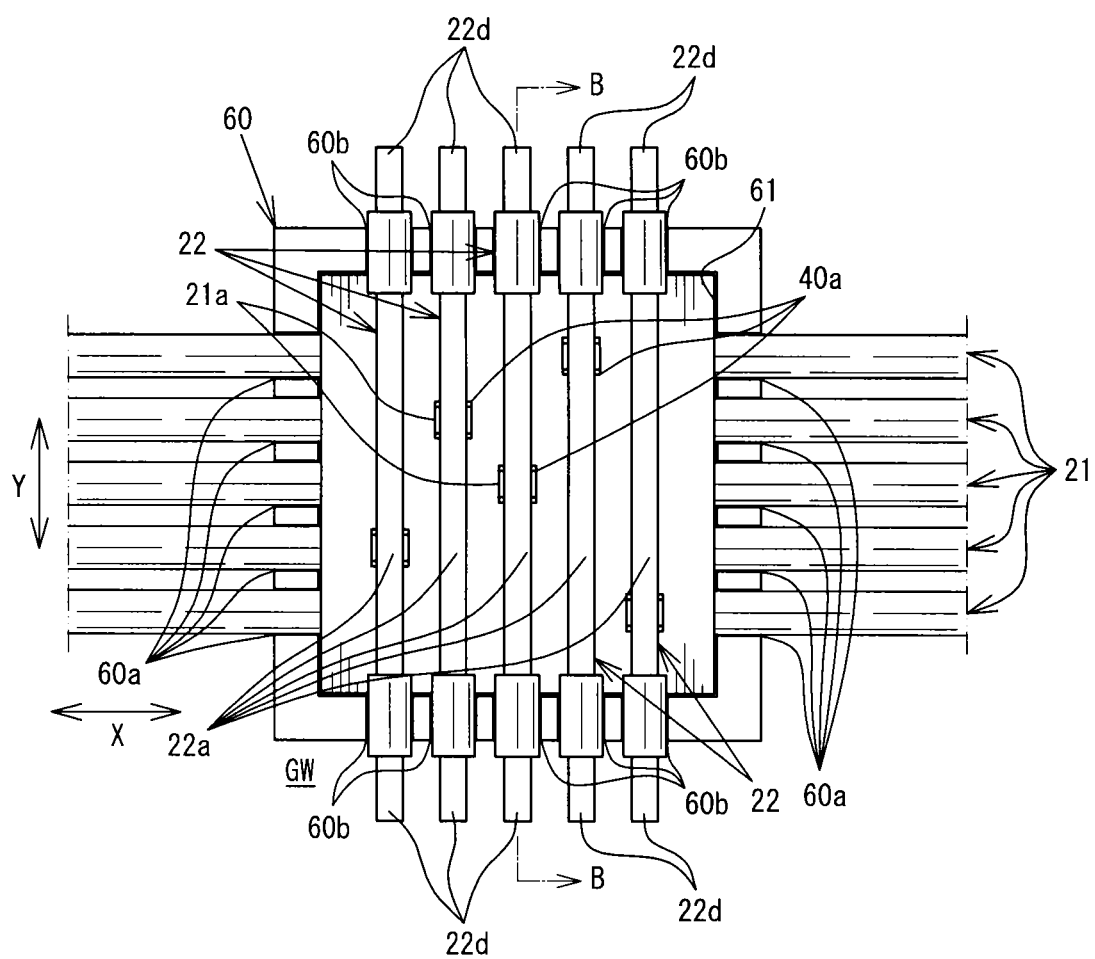
FIG. 18 is a plan view of the electric cable structural body having one side covered with the insulating holder.
Figure 19:
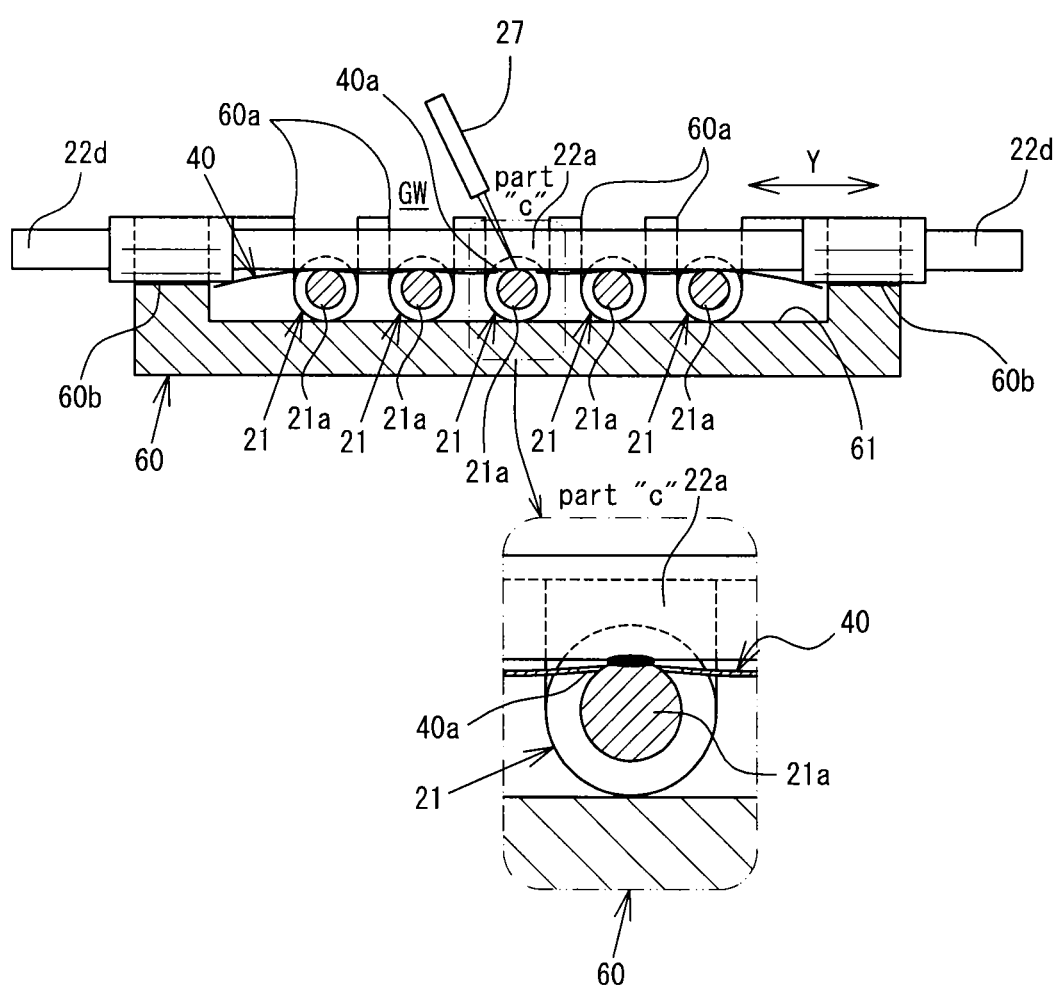
FIG. 19 shows a round conductors welded at an intersection portion thereof by laser welding.
Figure 20:
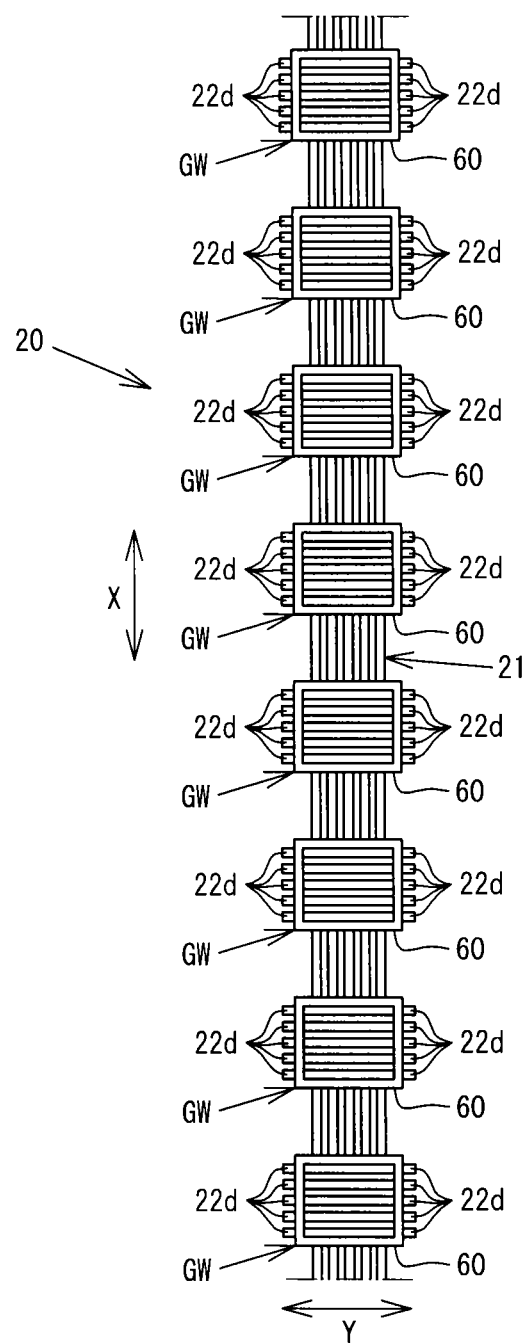
FIG. 20 is a plan view of the electric cable structural body including a plurality of intersection overlap portions located in the first direction.
Figure 21:
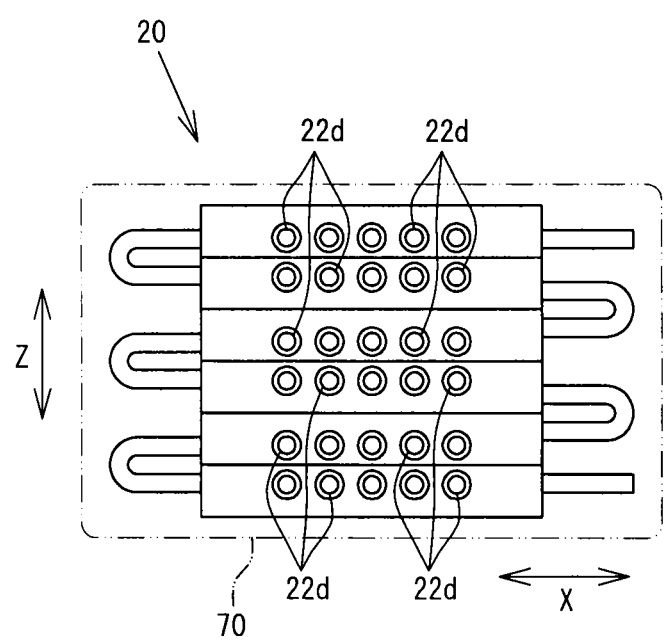
FIG. 21 is a side view of the electric cable structural body folded in a hairpin turn manner and stacked.

FIG. 15 is an isometric view showing how components of the electric cable structural body 20 are stacked. FIG. 16 is an isometric view showing an intersection insulating film 40 located between exposed conductor groups G1 and G2. FIG. 17 is an isometric view of the electric cable structural body 20 having one surface covered with an insulating holder 60. FIG. 18 is a plan view of the electric cable structural body 20 having one surface covered with the insulating holder 60. FIG. 19 shows a first round conductor 21a and a second round conductor 22a welded at an intersection portion thereof by laser welding. FIG. 20 is a plan view of the electric cable structural body 20 including a plurality of intersection overlap portions GW located in the first direction X. FIG. 21 is a side view of the electric cable structural body 20 folded in a hairpin turn manner and stacked.

In example 2, the electric cable structural body 20 includes five first covered electric cables 21 extending in the first direction X while being parallel to each other, five second covered electric cables 22 extending in the second direction Y intersecting the first covered electric cables 21, the intersection insulating film 40 held between the first covered electric cables 21 and the second covered electric cables 22 at an intersection thereof, and the insulating holder 60 covering one surface of the first covered electric cables 21 and the second covered electric cables 22 at the intersection (see FIG. 15 through FIG. 18).

The first covered electric cables 21 each include the first round conductor 21a and an insulating cover 21b covering the entire length of the first round conductor 21a. The five first covered electric cables 21 extend in the first direction X while being parallel in the second direction Y with a predetermined gap therebetween.

The first covered electric cables 21 each include an exposed conductor portion 21c formed at a predetermined position. The exposed conductor portions 21c are formed by removing a predetermined length of the insulating covers 21b by laser light irradiation to expose the first round conductors 21a. The exposed conductor portions 21c extend in the first direction X while being parallel to each other.

The exposed conductor portions 21c of the first round conductors 21a formed by removing the predetermined length of the insulating covers 21b form a first direction exposed conductor group G1. Namely, the first direction exposed conductor group G1 includes the exposed conductor portions 21c extending in the first direction X while being parallel to each other.

The second covered electric cables 22 each include the second round conductor 22a and an insulating cover 22b covering the entire length of the first round conductor 21a. The second round conductors 22a of the same number as that of the first round conductors 21a, namely, five second round conductors 22a, extend in the second direction Y while being parallel in the first direction X with a predetermined gap therebetween.

The second covered electric cables 22 each include an exposed conductor portion 22c formed in a central portion thereof. The exposed conductor portions 22c are formed by removing a predetermined length of the insulating covers 22b by laser light irradiation to expose the second round conductors 22a. The predetermined length of the insulating covers 22b corresponds to the width of the first covered electric cables 21, and thus the exposed conductor portions 22c have a length corresponding to the width of the first covered electric cables 21.

The exposed conductor portions 22c of the second round conductors 22a exposed by removing the predetermined length of the insulating covers 22b form a second direction exposed conductor group G2. Namely, the second direction exposed conductor group G2 includes the exposed conductor portions 22c extending in the second direction Y while being parallel to each other.

At each of two end portions of the second covered electric cables 22, terminal portions 22d connectable to the harness 3 or 4 are formed. The terminal portions 22d are formed by removing, by laser light irradiation, a part of the insulating covers 22b that protrudes from a corresponding end of the first covered electric cables 21 in the width direction to expose end portions of the second round conductors 22a.

The first direction exposed conductor group G1 including the plurality of exposed conductor portions 21c of the first covered electric cables 21 extending in the first direction X while being parallel to each other, and the second direction exposed conductor group G2 including the plurality of exposed conductor portions 22c of the second covered electric cables 22 extending in the second direction Y while being parallel to each other, intersect each other perpendicularly and also overlap each other in the up-down direction to form the intersection overlap portion GW.

Between the first direction exposed conductor group G1 and the second direction exposed conductor group G2 of the intersection overlap portion GW, the intersection insulating film 40 is located to electrically insulating the exposed conductor portions 21c and the exposed conductor portions 22c from each other. The intersection insulating film 40 has a plurality of windows 40a. The exposed conductor portions 21c of the second round conductors 22a, and the exposed conductor portions 22c of the round conductors 22b, facing each other via the windows 40a are connected so as to be conductive to each other. Thus, the electric cable structural body 20 is formed.

The insulting holder 60 is formed of an insulating synthetic resin, and has a size sufficiently large to accommodate and hold the intersection overlap portion GW of the first direction exposed conductor group G1 and the second direction exposed conductor group G2. An accommodating portion 61 accommodating the intersection overlap portion GW has grooves 60a engageably holding the first covered electric cables 21 and grooves 60b engageably holding the second covered electric cables 22.

The grooves 60a are formed at two ends of the insulting holder 60 in the first direction X. Five of the grooves 60a are located in correspondence with the number of the first covered electric cables 21, with a predetermined interval provided in the second direction Y. The grooves 60a each have a size sufficiently large to engageably hold the exposed end of the insulating cover 21b of the first covered electric cable 21.

The grooves 60b are formed at two ends of the insulting holder 60 in the second direction Y. Five of the grooves 60b are located in correspondence with the number of the second covered electric cables 22, with a predetermined interval provided in the first direction X. The grooves 60b each have a size sufficiently large to engageably hold the exposed end of the insulating cover 22b of the second covered electric cable 22.

Now, with reference to FIG. 15 through FIG. 21, a method for producing the electric cable structural body 20 described above will be described.

First, the insulating films 21b of the first covered electric cables 21 are irradiated with laser light to remove a predetermined length thereof extending in the first direction X (longitudinal direction). As a result, the first round conductors 21a are partially exposed to form the exposed conductors 21c.

The insulating films 22b in the central portion of the second covered electric cables 22 are irradiated with laser light to remove a predetermined length thereof extending in the second direction Y (width direction). As a result, the second round conductors 22a are partially exposed by a length corresponding to the width of the five first covered electric cables 21 located parallel to each other to form the exposed conductors 22c. The "predetermined length" is slightly longer than the maximum width of the total of the five first round conductors 21a of the first covered electric cables 21 located parallel to each other.

In addition, the insulating films 22b of the second covered electric cables 12 are irradiated with laser light to remove the two end portions thereof protruding outward from the ends of the first covered electric cables 11 in the width direction. As a result, the second round conductors 22a are exposed in the end portions to form the terminal portions 22d.

Next, the first direction exposed conductor group G1 including the plurality of exposed conductor portions 21c extending in the first direction X while being parallel to each other, and the second direction exposed conductor group G2 including the plurality of exposed conductor portions 22c extending in the second direction Y while being parallel to each other, are put to overlap each other while intersecting each other perpendicularly. At this point, the intersection insulating film 40 is located between the first direction exposed conductor group G1 and the second direction exposed conductor group G2, at a position where the first direction exposed conductor group G1 and the second direction exposed conductor group G2 intersect each other. As a result, the intersection overlap portion GW is formed (see FIG. 15 and FIG. 16).

The exposed conductor portion 21c of the first round conductors 21a, and the exposed conductor portion 22c of the second round conductors 22a, are caused to face each other while having the windows 40a of the intersection insulating film 40 therebetween (see FIG. 17 and FIG. 18). Then, a laser irradiation device 27 is moved to a position facing conductor intersection portions at which the first round conductors 21a and the second round conductors 22a intersect each other. Laser light emitted from the laser irradiation device 27 is directed to the conductor intersection portions of the first round conductors 21a and the second round conductors 22a via the windows 40a of the intersection insulating film 40. As a result, the first round conductors 21a and the second round conductors 22a are welded by spot welding (see the enlarged view of part "c" in FIG. 19).

In this manner, the first round conductors 21a of the first direction exposed conductor group G1 and the second round conductors 22a of the second direction exposed conductor group G2 are welded at the conductor intersection portions by spot welding in a good state with certainty.

After the welding is performed by spot welding as described above, the laser irradiation device 27 is retracted from the conductor intersection portions and moved to a position above or to the side of the intersection overlap portion GW. Thus, the welding work is completed.

Next, the insulating holder 60 is put to cover the rear surface of the intersection overlap portion GW to accommodate the intersection overlap portion GW in the accommodation portion 61 of the intersection overlap portion GW.

Then, the accommodation portion 61 is filled with a filler formed of an insulating synthetic resin. As a result, the intersection overlap portion GW is secured to the insulating holder 60.

Owing to this, the conductive state of the first round conductor 21a and the second round conductor 22a are provided stably for a long time, and the electric cable structural body 20 obtains sealability against water.

A plurality of the intersection overlap portions GW having the rear surface covered with the insulating holder t0 are formed at a predetermined interval provided in the first direction X. Then, the resultant assembly is folded along an intermediate line between each two adjacent intersection overlap portions GW in a hairpin turn manner, so that the insulating surface of an intersection overlap portion GW covered with the insulating holder 60 and the non-insulating surface of an adjacent intersection overlap portion GW not covered with the insulating holder 60 are in contact with each other. As a result, the electric cable structural body 20 including the plurality of intersection overlap portions GW stacked in the stacking direction Z is formed (see FIG. 20 and FIG. 21).

The electric cable structural body 20 described above may be usable in an electric connection structure that connects the backbone harnesses 3 and the branch harnesses 4 to each other (see FIG. 1 and FIG. 12), so that the backbone harnesses 3 and the branch harnesses 4 are connected in a desirable connection route in accordance with the type or grade of the vehicle. Thus, substantially the same functions and effect as those in example 1 are provided.

Each first round conductor 21a is covered with the insulating cover 21b to form the first covered electric cable 21, and each second round conductor 22a is covered with the insulating cover 22b to form the second covered electric cable 22. Therefore, the electric cable structural body 20 is produced at lower cost than in example 1 where the flat cables 11 and 12 are used. Thus, the cost is significantly reduced.

The electric cable structural body 20 may be accommodated and held in the insulating case 70 shown in FIG. 21 with the phantom line, or the outer insulating film 50 may be provided to cover the entirety of the accommodation portion 61 of the insulating holder, so that the electric cable structural body 20 is more insulating and sealable against water with more certainty.

The conductor according to the present invention corresponds to the rectangular conductor 11a or 12a, or the first or second round conductor 21a or 22a in the embodiment; and similarly;

the insulating unit corresponds to the intersection insulating film 40; and the insulating cover unit corresponds to the insulating holder 60.

However, the present invention is not limited to the above-described embodiment, and may be carried out in any of various embodiments based on the technological idea shown by the claims.

In example 1, the insulating covers 12b are removed at the two end portions of the second flat cable 12. Alternatively, a strip-like insulating cover 12b extending in the first direction X may be formed at the two end portions of the rectangular conductors 12a located parallel to each other, integrally with the rectangular conductors 12a.

Instead of the outer insulating films 50, the insulating holder 60 described in example 2 may be put on at least one of the front surface and the rear surface of the intersection overlap portion GW in the electric cable structural body 10.

In example 2, the first covered electric cables 21 and the second covered electric cables 22 respectively include the first and second round conductors 21a and 22a and the insulating covers 21b and 22b. The present invention is not limited to this. For example, a core wire may be covered with a mesh-like or thin-film shielding member formed of aluminum or the like, and then may be covered with an insulating cover. Alternatively, the first covered electric cables 21 and the second covered electric cables 22 may each be a twisted pair cable formed of a plurality of twisted covered electric cables. Still alternatively, the conductors of the first covered electric cables 21 and the second covered electric cables 22 may be each formed of a single conductive cable, or a twisted cable formed of a plurality of wires.

Instead of the second covered electric cables 22 each including the second round conductor 22a and the insulating covers 22b covering a circumferential surface of the second round conductor 22a, five raw electric cables not covered with the insulating covers 22b may be located parallel to each other to form the second direction exposed conductor group G2.

In the above example, the intersection overlap portion GW of the electric cable structural body 20 is accommodated and held in the insulating holder 60. The present invention is not limited to this. For example, a cover that covers the insulating holder 60 may be provided to cover and hold the intersection overlap portion GW in cooperation with the insulating holder 60.

Regarding the exposed conductor portions 22c and the terminal portions 22d, portions of each second round conductor 22a that protrude outward from the two ends of the first covered electric cables 21 in the width direction may be respectively covered with a pair of insulating covers 21b.

The intersection overlap portion GW of the first flat cable 11 and the second flat cable 12 may be covered with the insulating holder 60, or the intersection overlap portion GW of the first covered electric cables 21 and the second covered electric cables 22 may be covered with the pair of outer insulating films 50. Alternatively, an opening of each insulating holders 60 covering the intersection overlap portion GW may be closed by an insulating lid member.

The first cable 11 and the second flat cable 12 may be welded at the intersection thereof by laser welding. The first round conductors 21a of the first covered electric cables 21 and the second round conductors 22a of the second covered electric cables 22 may be welded at the conductor intersection portions thereof by electric resistance welding or supersonic vibration.

Hereinafter, another embodiment of the present invention will be described with reference to the drawings.

Example 3

Figure 22:
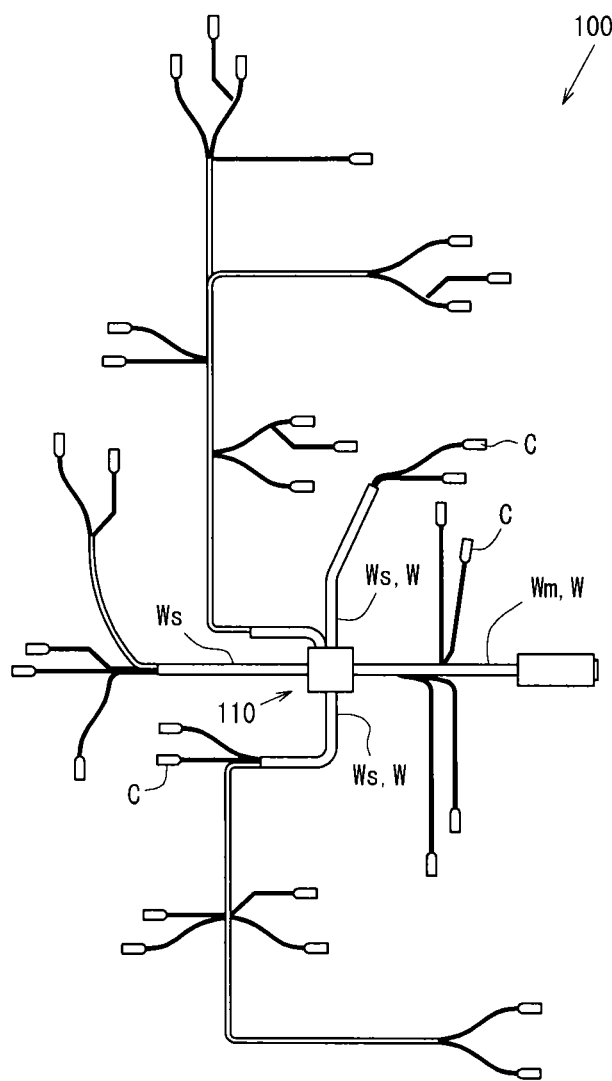
FIG. 22 is a plan view of a harness connection structure including a plurality of wire harnesses.
Figure 23:
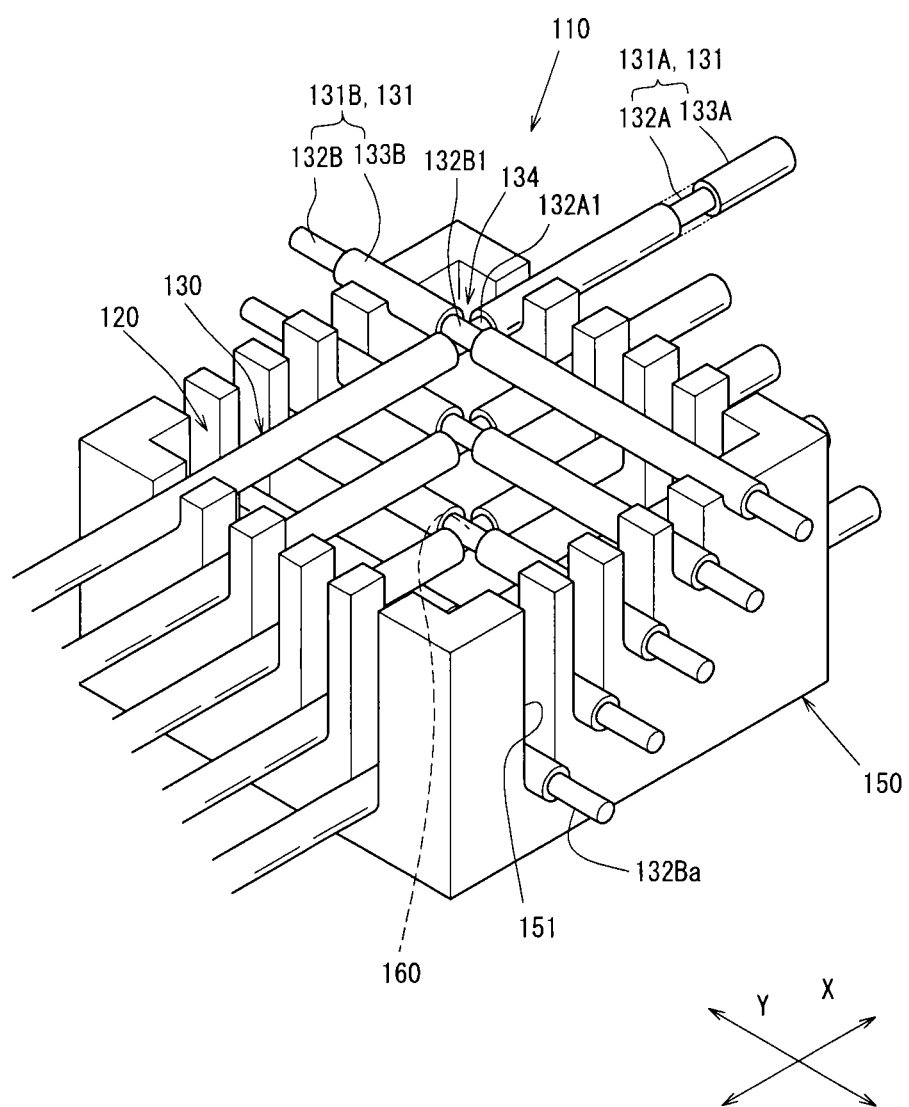
FIG. 23 is an isometric view of a branch connector.
Figure 24:
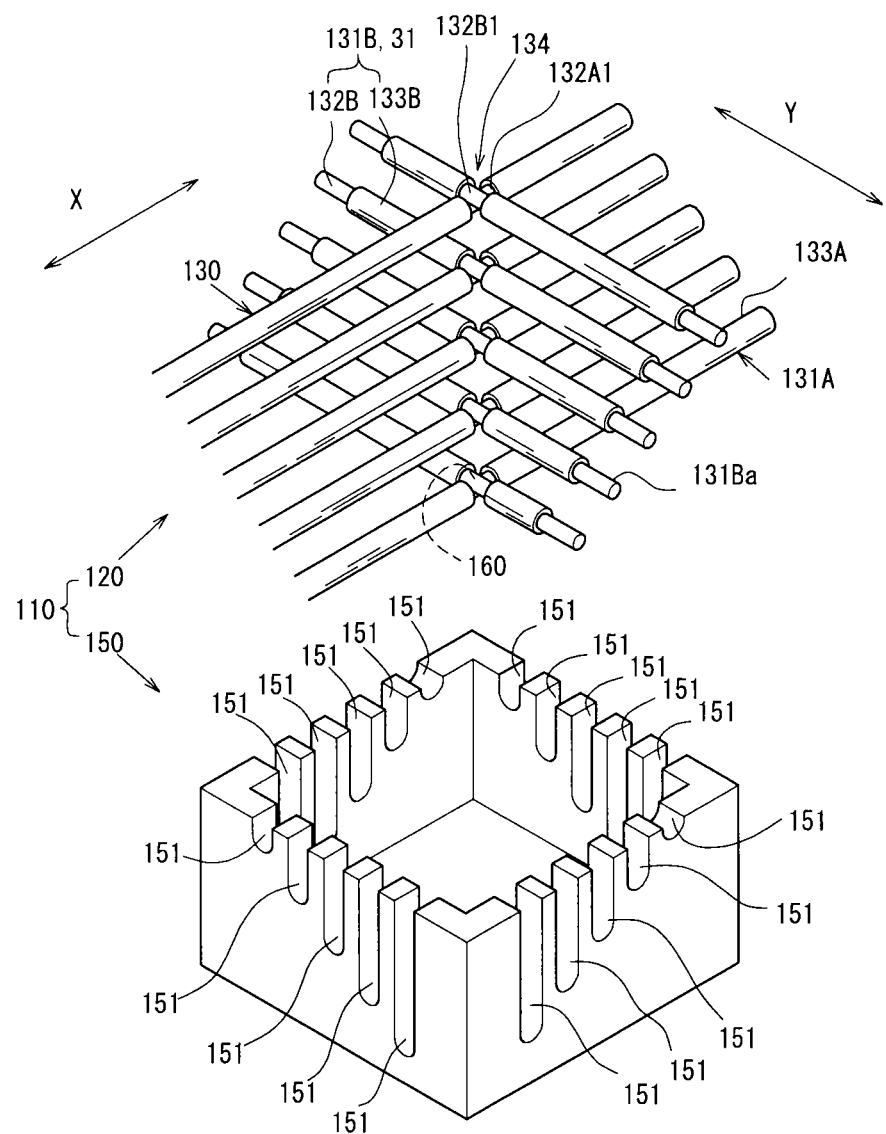
FIG. 24 is an exploded isometric view of the branch connector.

In a vehicle such an automobile or the like, a wire harness connection structure 100 mutually connecting a power source, a control device such as an ECU (Engine Control Unit) and an electric device such as an audio device, a direction indicator or the like includes, as shown in FIG. 22, a wire harnesses W and a branch connector 110 connecting the wire harness W.

The wire harness W includes a backbone harness Wm connected with the power source or the control device, and branch harnesses Ws that are each branched from the backbone harness Wm and has, at an end thereof, a connector C connected with each of electric devices. The branch connector 110 is connected with at least one of the backbone harness Wm and the branch harnesses Ws.

With reference to FIG. 23 through FIG. 27, the branch connector 110 in the harness connection structure 100 will be described in detail.

As shown in FIG. 23 through FIG. 27, the branch connector 110 includes an electric cable group intersection portion 120 including a plurality of covered electric cables 131 that are located in a generally lattice pattern, and also includes a holder 150 holding the electric cable group intersection portion 120.

Figure 25:
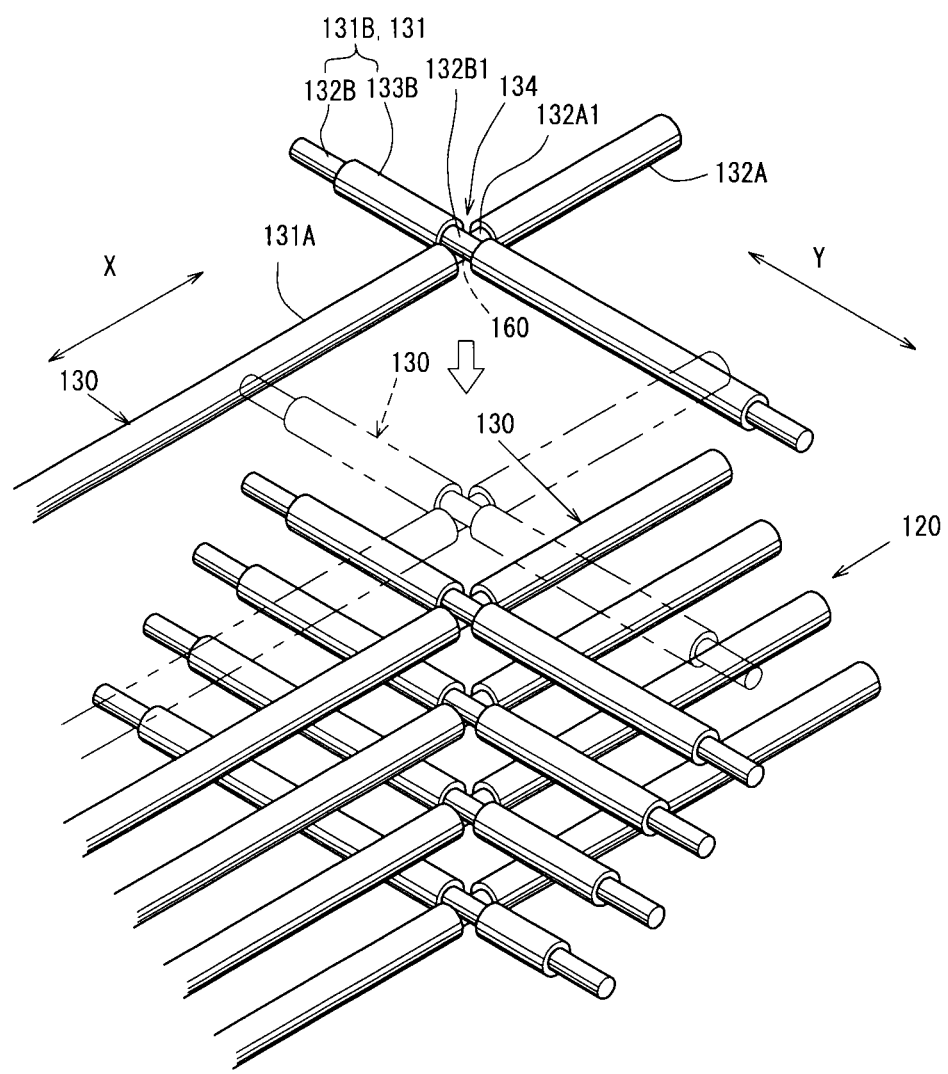
FIG. 25 shows a structure of an electric cable intersection portion including a plurality of intersecting electric cable groups positionally arranged.

As shown in FIG. 25, the electric cable group intersection portion 120 includes a plurality of intersecting electric cable groups 130 stacked to form a generally lattice pattern. The intersecting electric cable groups 130 are formed of an integral body including a first covered electric cable 131A and a second covered electric cable 131B conductive to each other.

In the following description, an X direction is a longitudinal direction of the first covered electric cables 131A located parallel to each other. A Y direction is a longitudinal direction of the second covered electric cables 131B located parallel to each other.

This will be described in more detail. The first covered electric cables 131A and the second covered electric cables 131B each include a conductive core wire 132 (132A, 132B) and an insulating cover 133 (133A, 133B) covering the conductive core wire 132A or 132B. The insulating covers 133A and 133B are each removed in a predetermined portion in the entirety of a surface thereof in a circumferential direction to expose the core wire 132A or 132B. The exposed portions of the core wires 132A and 132B are conductor exposed portions 132A1 and 132B1.

As shown in FIG. 22, among two ends of each first covered electric cable 131A derived from the branch connector 110, one end is connectable with the branch harness Ws whereas the other end is connectable with the backbone harness Wm. By contrast, two ends of each second covered electric cable 131B derived from covered electric cable 131A are each connectable with the branch harness Ws.

Each intersecting electric cable group 130 is located such that the longitudinal direction of the first covered electric cable 131A is generally perpendicular to the longitudinal direction of the second covered electric cable 131B, and the conductor exposed portion 132A1 of the first covered electric cable 131A and the conductor exposed portion 132B1 of the second covered electric cable 131B are welded together. At an electric cable intersection portion 134 (welding position) of the core wire 132A of the first covered electric cable 131A and the core wire 132B of the second covered electric cable 131B, a welded portion 160 formed of the welded conductor exposed portions 132A1 and 132B1 is provided.

Figure 26:
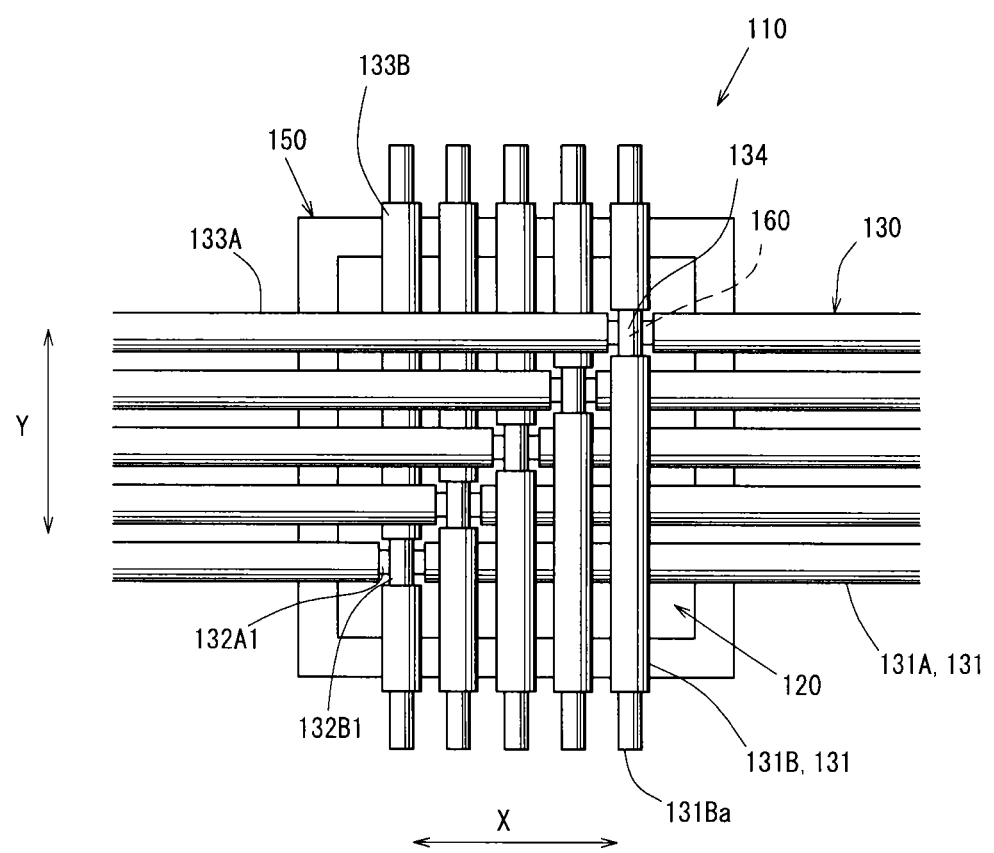
FIG. 26 is a plan view of the branch connector.

As shown in FIG. 25 and FIG. 26, the electric cable group intersection portion 120 includes the plurality of intersecting electric cable groups 130 that are stacked such that the first covered electric cables 131A are located parallel to each other and the second covered electric cables 131B are located parallel to each other. At this point, the intersecting electric cable groups 130 are stacked from one side of the electric cable group intersection portion 120 such that the welded portions 160 are on a diagonal line of the generally lattice pattern with a predetermined interval in the order in which the intersecting electric cable groups 130 are stacked.

Herein, the intersection portion of the first covered electric cable 131A and the second covered electric cable 131B of one, same intersecting electric cable group 130 is referred to as a "same group electric cable intersection portion", and the intersection portion of the covered electric cable 131 of a predetermined intersecting electric cable group 130 and the covered electric cable 131 of another intersecting electric cable group 130 is referred to as a "different group electric cable intersection portion". The electric cable intersection portions 134 include a plurality of same group electric cable intersection portions and different group electric cable intersection portions.

Figure 27:
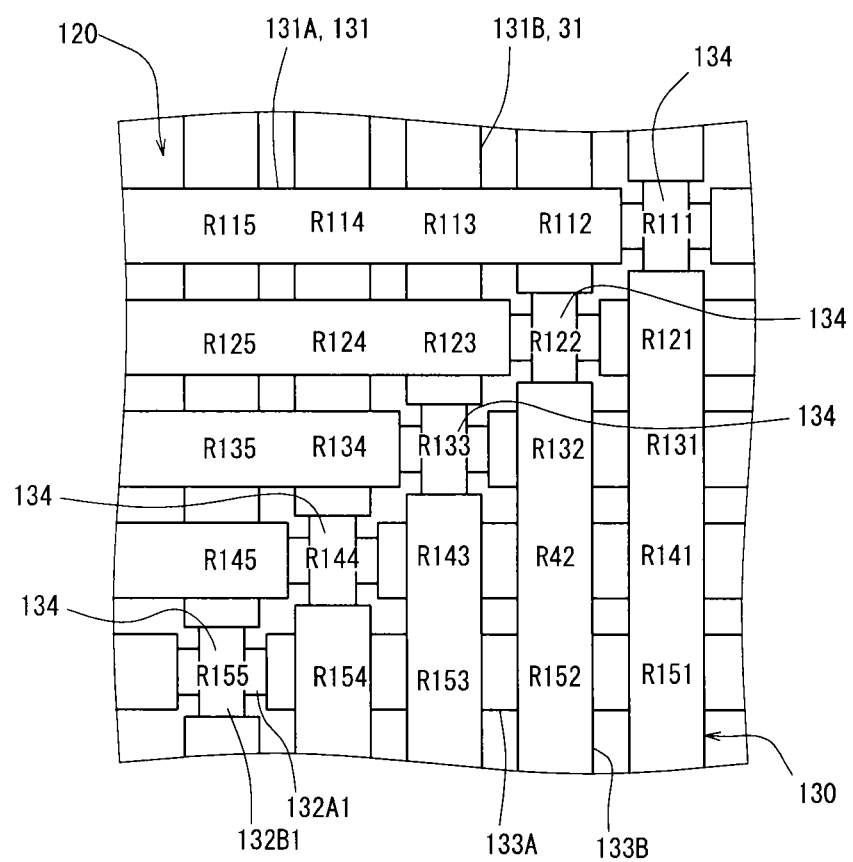
FIG. 27 shows a structure of the electric cable intersection portion.

This will be described in more detail. As shown in FIG. 26 and FIG. 27, as seen in a plan view, the electric cable group intersection portion 120 includes five second covered electric cables 131B located from the right to the left and also includes five first covered electric cables 131A from the top to the bottom in FIG. 26 and FIG. 27. In accordance therewith, the plurality of electric cable intersection portion 134 are located in five rows by five columns.

As shown in FIG. 27, the plurality of electric cable intersection portion 134 are referred to as R111 through R115, R121 through R125, R131 through R135, R141 through R145, and R151 through R155 in correspondence with the covered electric cables 131 located in the lattices of five rows by five columns.

Among the plurality of electric cable intersection portion 134 (R111 through R115, R121 through R125, R131 through R135, R141 through R145, and R151 through R155), the same group electric cable intersection portions R111, R122, R133, R144 and R155 are electric cable conductive-state intersection portions where the first covered electric cable 131A and the second covered electric cable 131B are connected with each other in a conductive state.

Among the plurality of electric cable intersection portion 134 (R111 through R115, R121 through R125, R131 through R135, R141 through R145, and R151 through R155), the different group electric cable intersection portions R112 through R115, R121, R123 through R125, R131, R132, R134, R135, R141 through R143, R145, and R151 through R154 are electric cable non-conductive-state intersection portions where the first covered electric cable 131A and the second covered electric cable 131B are connected with each other in a non-conductive state.

The holder 150 is formed of an insulating synthetic resin or the like, and has a size sufficiently large to accommodate the electric cable group intersection portion 120. The holder 151 has holding grooves 151 each engageably holding the first covered electric cables 131A or the second covered electric cables 131B.

Now, with reference to FIG. 28, a method for forming the intersecting electric cable group 130 by welding the first covered electric cable 131A and the second covered electric cable 131B described above will be described as production method example 1.

Production Method Example 1

First, in an insulating cover removal step, for example, laser light L is directed toward a predetermined portion of the first covered electric cable 131A to remove a predetermined position in the insulating cover 133A. The predetermined portion extends in the longitudinal direction, and the insulating cover 133A in this portion is removed along the entirety of a surface thereof in the circumferential direction. As a result, the core wire 132A is exposed in the conductor exposed portion 132A1. Similarly, the insulating cover 133B is removed from the second covered electric cable 131B to expose the core wire 132B in the conductor exposed portion 132B1.

In an intersection positional arrangement step, the first covered electric cable 131A and the second covered electric cable 131³ are put to overlap each other such that the conductor exposed portion 132A1 of the first covered electric cable 131A and the conductor exposed portion 132B1 of the second covered electric cable 131B are put into contact with each other, and such that the longitudinal direction of the first covered electric cable 131A and the longitudinal direction of the second covered electric cable 131B are perpendicular to each other.

Figure 28:
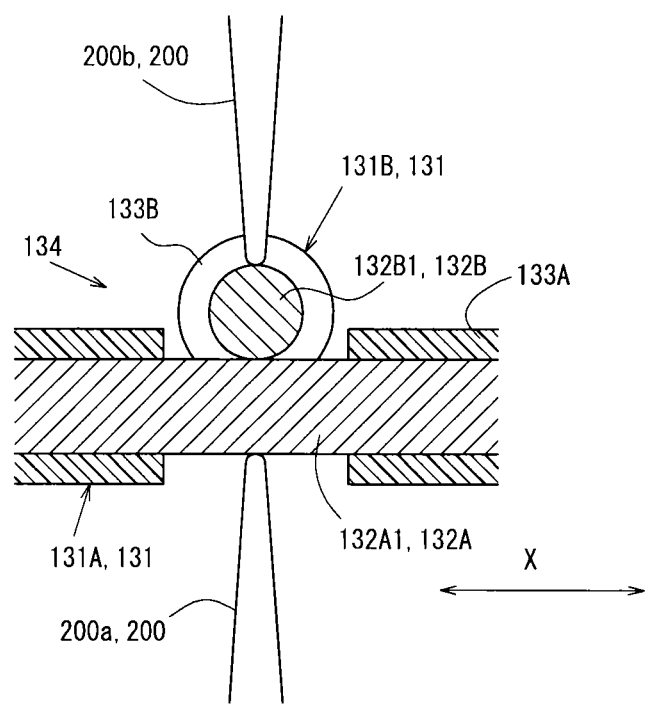
FIG. 28 shows a conductor joining step of joining conductors by use of a pair of electrodes.

Then, in a conductor joining step, as shown in FIG. 28, the conductor exposed portion 132A1 of the first covered electric cable 131A and the conductor exposed portion 132B1 of the second covered electric cable 131B are crimped together by use of a pair of probes 200a and 200b (200) in a transverse direction (diametric direction) of the core wires 132A and 132B, and the core wire 132A of the first covered electric cable 131A and the core wires 132B of the second covered electric cable 131B are welded together by electric resistance welding. By the electric resistance welding, an electric current is supplied between the pair of probes 200a and 200b.

The first covered electric cable 131A and the second covered electric cable 131B are welded in this manner to form the intersecting electric cable group 130, which is cross-shaped. In an intersecting electric cable group positional arrangement step, a plurality of such intersecting electric cable groups 130 are stacked to form the electric cable group intersection portion 120.

Then, in a holder accommodation step, the electric cable group intersection portion 120 is accommodated and held in the holder 150. An insulating synthetic resin (not shown) is supplied to the inside of the holder 150 to secure the electric cable group intersection portion 120 to the holder 150 and to cover the core wires 132A of the first covered electric cable 131A and the core wires 132B of the second covered electric cable 131B. In this manner, the branch connector 110 is formed.

The branch connector 110 described above provides the following functions and effects.

The branch connector 110 in example 3 includes the intersecting electric cable groups 130, which are each formed as follows. The covered electric cable 131 including the core wire 133 and the insulating cover 133 covering the core wire 133 is provided as the first covered electric cable 131A extending in the X direction and the second covered electric cable 131B extending in the Y direction intersecting the X direction. The conductor exposed portion 132A1 of the first covered electric cable 131A and the conductor exposed portion 132B1 of the second covered electric cable 131B are jointed together to be conductive to each other at the electric cable intersection portion 134, which is the intersection of the first covered electric cable 131A and the second covered electric cable 131B. Thus, the intersecting electric cable group 130 is formed.

The branch connector 110 includes the electric cable group intersection portion 120, in which the plurality of first covered electric cables 131A located parallel to each other and the plurality of second covered electric cables 131B located parallel to each other intersect each other in the same plane. In the electric cable group intersection portion 120, the plurality of intersecting electric cable groups 130 are positionally arranged such that the first covered electric cables 131A are parallel to each other and such that the second covered electric cables 131B are parallel to each other.

Owing to the above structure, the branch connector 110 provides the following effects.

The effects will be described in detail. Recently, a vehicle accommodates various types of electric devices including a lamp, an audio device, an ABS, a rear camera and the like. The vehicle also includes a wire harness that supplies electric power or control signals to these various types of electric devices. In the case where a common signal is input to the plurality of electric devices, it is desirable that common connectors are connected to the harness in order to reduce the cost.

However, the number of pins of the connectors of the wire harnesses is different in accordance with the type of the vehicle, or in accordance with the grade or specifications of the same type of vehicle. For this reason, different connectors need to be provided for each type, grade or specifications, which does not allow the cost to be reduced.

Under such circumstances, connectors commonly usable for different connection positions or for different types or grades of the vehicle have been proposed. According to such connectors, the number of pins or the positions of the pins are selected in accordance with the type of signals transferred between the electric devices.

The above-described branch connector described in Patent Document 1 is one of such connectors.

In this branch connector, a plurality of crimp terminals are located at predetermined positions in a connector main body, and a plurality of electric cables are located so as to intersect each other in a transverse direction and a longitudinal direction in the connector main body. The plurality of electric cables are put into pressure contact with the plurality of crimp terminals appropriately on a front surface and a rear surface of the branch connector. Thus, a branch circuit is formed.

However, the branch connector keeps the electric cables in a state of being arranged at a predetermined pitch by use of the connector main body and dedicated jigs such as the crimp terminals or the like. Without the dedicated jigs, the branch connector cannot keep the electric cables in a state of being arranged at a predetermined pitch. In the case where such dedicated jigs are provided for the connection portions of the plurality of wire harnesses in a vehicle, there occurs a problem that the cost is raised or that the required space is enlarged.

The crimp terminals may be put into pressure contact with predetermined positions in the connector main body. However, the crimp terminals, when being put into pressure contact in this manner, may come off because of the vibration of the vehicle or the like. When the crimp terminals come off like this, the connection state between the electric cables located on the front surface and the electric cables located on the rear surface is not maintained, namely, the conductive state between the electric cables is not guaranteed.

By contrast, the branch connector 110 having the above-described structure allows the first covered electric cables 131A and the second covered electric cables 131B to be arranged in the electric cable group intersection portion 120 in a desirable wiring pattern easily and accurately with no need for the dedicated jigs.

The number of the intersecting electric cable groups 130 or the positional arrangement thereof may be changed appropriately, so that the branch connector 110 may be in a form suitable to any of various functions or installment locations. Therefore, common components are usable for the branch connectors 110.

Owing to this, the branch connector 110 is produced at lower cost and installed in a smaller space.

The plurality of intersecting electric cable groups 130 that are formed into an integral body are provided as the electric cable group intersection portion 120. Therefore, the branch connector 110 has a higher reliability electrically.

This will be described in more detail. According to a conventional method, the plurality of first covered electric cables 131A are located to extend in the X direction while being parallel to each other, and the plurality of second covered electric cables 131B are located to extend in the Y direction while being parallel to each other. Then, the covered electric cables 131 are connected to be conductive to each other at each appropriate electric cable intersection portion 134 among the plurality of electric cable intersection portions 134 of the first covered electric cables 131A and the second covered electric cables 131B. In this case, the direction or the pitch of the covered electric cables may be easily shifted, which makes it difficult to keep the covered electric cables 131 at a predetermined positional arrangement.

In order to solve this problem, it is conceivable to provide a dedicated jig capable of holding the first covered electric cables 131A and the second covered electric cables 131B in the predetermined positional arrangement. However, the size or shape of the jig needs to be changed in accordance with the diameter of the covered cable 131 or the number of the covered cable 131 to be located in the intersection portions. This requires various sizes ad shapes of jigs to be prepared, which raises the cost.

Namely, in the structure in which the plurality of covered electric cables 131 are held by a jig, there may occur the following problem. One type of jig is not compatible for the plurality of covered electric cables 131 of different diameters, and thus cannot firmly hold the covered electric cables 131. As a result, the covered electric cables 131 wobble due to the vibration of the vehicle. In this case, the conductive state between the covered electric cables 131 is not guaranteed. There may occur another problem that the space or the cost is not reduced.

By contrast, the branch connector 110 in this embodiment is provided as follows. The conductor exposed portion 132A1 of the first covered electric cable 131A and the conductor exposed portion 132B1 of the second covered electric cable 131B are jointed together to be conductive to each other at the intersection portion thereof. Thus, the intersecting electric cable group 130 is formed. The plurality of such intersecting electric cable groups 130 are located such that the plurality of first covered electric cables 131A are parallel to each other, and the plurality of second covered electric cables 131B are parallel to each other, in the same plane. Thus, the electric cable structural body is formed at the electric cable group intersection portion 120.

In this manner, the branch connector 110 is formed by merely providing the plurality of intersecting electric cable groups 130, each of which is formed in advance, so as to form the electric cable group intersection portion 120.

Therefore, the branch connector 110 in which the plurality of first covered electric cables 131A located to extend in the X direction, and the plurality of second covered electric cables 1313 located to extend in the Y direction intersecting the X direction, intersect each other in a conductive state is formed accurately and easily with no need for any special jig.

The number of the intersecting electric cable groups 130 or the positional arrangement thereof may be changed appropriately, so that the branch connector 110 may be in a form suitable to any of various functions or installment locations. Therefore, the branch connectors 110 is commonly usable for various vehicles.

Owing to this, the intersecting electric cable groups 130 are produced at lower cost and installed in a smaller space.

According to the above-described structure, the first covered electric cable 131A and the second covered electric cable 131B are highly integrated together at the intersection portion thereof. Therefore, the branch connector 110 has a higher reliability electrically.

This will be described in more detail. The branch connector 110 in this embodiment is formed as follows. The intersecting electric cable group 130 including the first covered electric cables 131A and the second covered electric cables 131B in an integral manner is first formed. The plurality of such intersecting electric cable group 130 are located appropriately to form the intersection portion. This is different from the method of independently locating the plurality of first covered electric cables 131A and the second covered electric cables 131B in an area where the intersection portion is to be provided.

According to this embodiment, the intersecting electric cable groups 130 each formed as an integral body in advance are positionally arranged. According to the above-described different method, the plurality of first covered electric cables 131A and the plurality of second covered electric cables 131B are independently located in an area where the intersection portion is to be provided. Then, the first covered electric cables 131A and the second covered electric cables 131B are joined together at the electric cable intersection portion 134. Unlike by this method, according to this embodiment, it is not necessary to join the covered electric cables 131 with an undesirable possibility that the arranged state of the first covered electric cables 131A and the second covered electric cables 131B may be destroyed.

According to a conventional branch connector, for example, the crimp terminals are inserted into an intersection portion and connected with the covered electric cables 131 by pressure to provide conductivity with the covered electric cables 131. By contrast, with the branch connector 110 in example 3, the conductor exposed portions 132A1 of the first covered electric cables 131A and the conductor exposed portions 132B1 of the second covered electric cables 131B are joined together to connect the covered electric cables 131. Owing to this, the intersecting electric cable groups 130 each have a high level of integrity.

Therefore, for example, a situation where the pressure-contact portion of the crimp terminal is gradually loosened by the vibration of the vehicle and comes off is avoided.

For the above-described reasons, the first covered electric cables 131A and the second covered electric cables 131B are highly integral with each other at the intersection portion. The branch connector 110 has a higher reliability electrically.

In addition, in example 3, the covered electric cables 131 in the branch connector 110 each include one core wire 132.

According to the above-described structure, it is not necessary to locate a plurality of flat cables so as to intersect each other to form the electric cable group intersection portion 120. It is merely necessary to locate the plurality of intersecting electric cable groups 130. Thus, the first covered electric cables 131A are located parallel to each other, and the second covered electric cables 131B are located parallel to each other to provide a desirable pattern easily and accurately.

Therefore, the covered electric cables 131 which cost less than the flat cables may be used to form the electric cable group intersection portion 120, and thus the electric cable structural body is produced. This significantly reduces the cost in the case where the number of the core wires 132 is the same.

In the branch connector 110 in example 3, the plurality of intersecting electric cable groups 130 are formed as follows. A plurality of second covered electric cables 131B are located with an interval provided in the longitudinal direction of the first covered electric cables 131A, and are put to intersect the first covered electric cable 131A. The first covered electric cable 131A and the second covered electric cables 131B are connected to each other with the appropriate electric cable intersection portion 134 being in a conductive state. Therefore, a plurality of electric cable group intersection portions 120 are located with an interval provided in the longitudinal direction of the first covered electric cables 131A, namely, in the X direction. Thus, the electric cable structural body may have any of a wide variety of wiring patterns.

The branch connector 110 in example 3 includes the holder 150 accommodating the electric cable group intersection portion 120. Owing to this, the plurality of first covered electric cables 131A located parallel to each other and the plurality of second covered electric cables 131B located parallel to each other are kept at a predetermined pitch and a predetermined angle.

The electric cable group intersection portion 120 is accommodated in the holder 150. Therefore, the appropriate electric cable intersection portions 134 at which the conductor exposed portions 132A1 and 132B1 are joined together are protected against moisture and thus the insulation between the conductor exposed portions 132A1 and 132B1 is guaranteed. As compared with the case where the holder 150 is not provided, the electrical characteristics are superior.

The method for producing the branch connector 110 in example 3 provides the following functions and effects.

According to the method for producing the branch connector 110 in example 3, in the intersecting electric cable group positional arrangement step, the plurality of intersecting electric cable groups 130 are merely located such that the first covered electric cables 131A are parallel to each other and such that the second covered electric cables 131B are parallel to each other, and thus the electric cable group intersection portion 120 is formed. Advantageously, it is not necessary to perform the insulating cover removal step or the conductor joining step in the intersecting electric cable group positional arrangement step.

According to a conventional production method, the conductor exposed portions 132A1 and 132B1 of the covered electric cables 131 intersecting each other are jointed in the intersecting electric cable group positional arrangement step. With the production method in example 3, unlike with the conventional production method, there is no undesirable possibility that the pitch or angle of the plurality of covered electric cables 131 located parallel to each other is shifted. The electric cable structural body is produced accurately and easily.

Especially in the conductor joining step, the positive electrode probe 200a is put into contact with the conductor exposed portion 132A1 of the first covered electric cable 131A, and the negative electrode probe 200b is put into contact with the conductor exposed portion 132B1 of the second covered electric cable 131B, and an electric current that is sufficiently large to weld the conductor exposed portions 132A1 and 132B1 is supplied between the pair of probes 200 (200a, 200b). In this manner, the conductor exposed portions 132A1 and 132B1 are more strongly welded by electric resistance welding by use of heat generated by the resistance of the conductor exposed portions 132A1 and 132B1.

For stacking the intersecting electric cable groups 130 to form a generally lattice pattern in the intersecting electric cable group positional arrangement step, an intersecting electric cable group 130 is stacked on another electric cable group 130 that is already located. Thus, the intersecting electric cable groups 130 are stacked from one side of the electric cable group intersection portion 120 in a thickness direction thereof.

Owing to this, the conductor exposed portions 132A1 and 132B1 are kept in a good joining state at the electric cable intersection portion 134 of the first covered electric cable 131A and the second appropriate electric cable intersection portion 131B included in each intersecting electric cable group 130.

This will be described in more detail. For stacking the intersecting electric cable groups 130 to form a generally lattice pattern, the second covered electric cable 131B of an intersecting electric cable group 130 to be newly located needs to be twisted to intersect the first covered electric cable 131A of another intersecting electric cable group 130 already located. In this case, the electric cable intersection portion 134 at which the conductor exposed portion 132A1 and 132B1 of the intersecting electric cable group 130 are joined together receives a load. As a result, the joined conductor exposed portion 132A1 and 132B1 may be undesirably separated from each other.

By contrast, with the method for producing the branch connector 110 in example 3, for stacking the intersecting electric cable groups 130 to form a generally lattice pattern in the intersecting electric cable group positional arrangement step, an intersecting electric cable group 130 is stacked on another electric cable group 130 that is already located. Thus, the intersecting electric cable groups 130 are stacked from one side of the electric cable group intersection portion 120 in a thickness direction thereof. In the case where the intersecting electric cable groups 130 are stacked in this manner to form a generally lattice pattern, no load is applied to the electric cable intersection portion 134. Therefore, the conductor exposed portion 132A1 and 132B1 are kept in a good conductive state in the electric cable group intersection portion 120.

Production Method Example 2

Now, a method for producing the intersecting electric cable group 130 different from production example 1 will be described in detail with reference to FIGS. 29A and 29B through FIG. 31. In this example also, the first covered electric cable 131A and the second covered electric cable 131B are welded together in the conductor joining step to form the intersecting electric cable group 130.

Figure 29A:
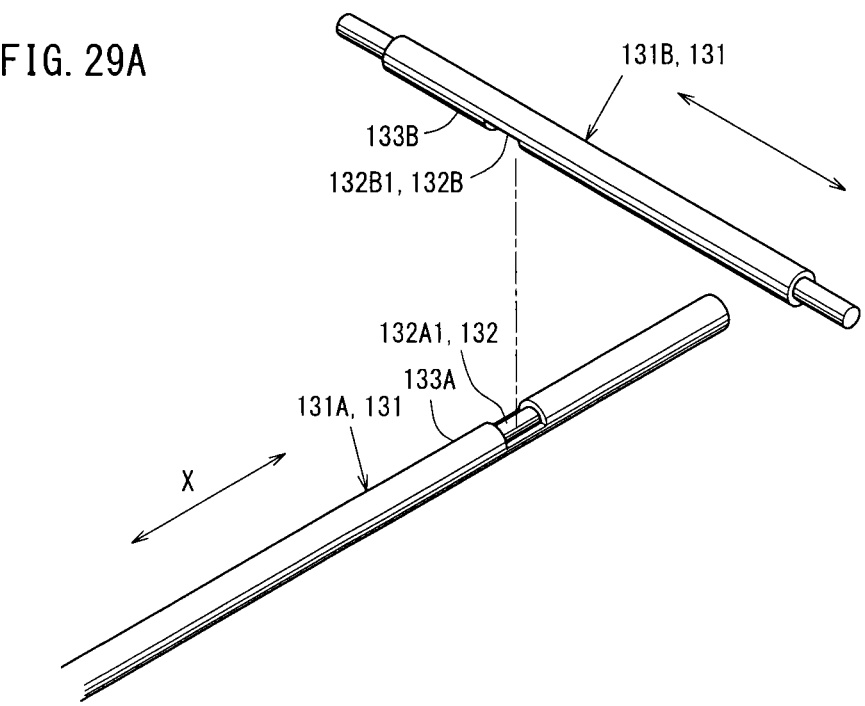
FIGS. 29A and 29B show the conductor joining step of causing a first covered electric cable and a second covered electric cable to intersect each other.
Figure 29B:
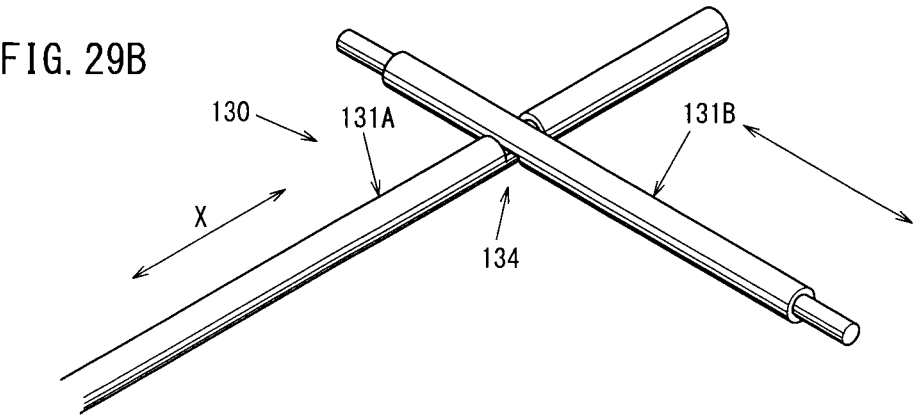
Figure 30:
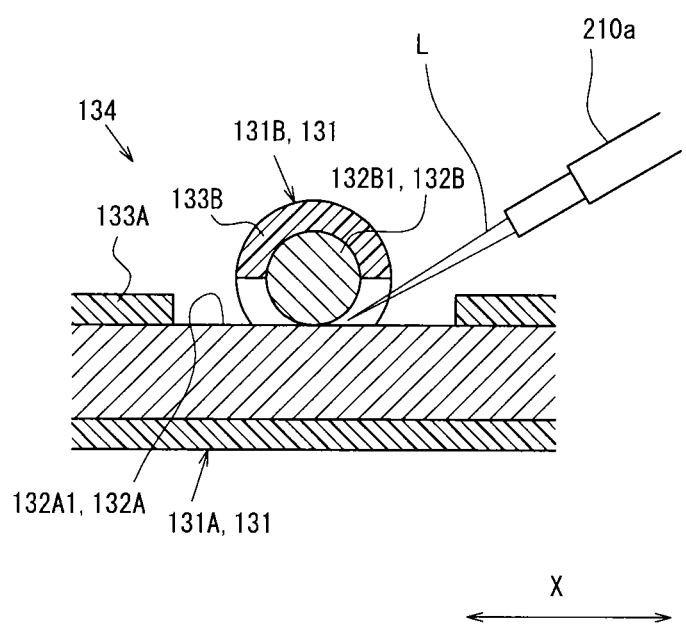
FIG. 30 is a cross-sectional view showing how the conductor joining step is performed by laser irradiation.

The elements identical with those of production method example 1 will bear the same reference signs, and detailed descriptions thereof will be omitted. FIGS. 29A and 29B show the conductor joining step in which the conductor exposed portions 132A1 and 132B1 are jointed together by laser irradiation. FIG. 30 shows the conductor joining step in which the conductor exposed portions 132A1 and 132B1 are jointed together by laser irradiation. FIG. 30 shows the covered electric cables 131 intersecting each other, and one of the covered electric cables 131 is shown with a perpendicular cross-section.

In production method example 2, the intersecting electric cable group 130 is produced as follows. The insulating cover 133A is removed from the first covered electric cable 131A along a half of a surface thereof in the circumferential direction to form the conductor exposed portion 132A1. The insulating cover 133B is removed from the second covered electric cable 131B along a half of a surface thereof in the circumferential direction to form the conductor exposed portion 132B1. Then, the conductor exposed portions 132A1 and 132B1 are welded together by laser spot welding.

This will be described in more detail. For example, laser light L is directed toward a predetermined position in the first covered electric cable 131A to remove a predetermined portion of the insulating cover 133A. The predetermined portion extends in the longitudinal direction, and the insulating cover 133A in this portion is removed along a half of the surface thereof in the circumferential direction. As a result, as shown in FIG. 29A, the core wire 132A is exposed in the conductor exposed portion 132A1. Similarly, the insulating cover 133B is removed from the second covered electric cable 1313 to expose the core wire 132B in the conductor exposed portion 132B1.

As shown in FIG. 29B, the first covered electric cable 131A and the second covered electric cable 131B are put to overlap each other such that the conductor exposed portion 132A1 of the first covered electric cable 131A and the conductor exposed portion 132B1 of the second covered electric cable 131B are put into contact with each other, and such that the longitudinal direction of the first covered electric cable 131A and the longitudinal direction of the second covered electric cable 131B are perpendicular to each other.

Then, as shown in FIG. 30, the contact portion of the conductor exposed portion 132A1 of the first covered electric cable 131A and the conductor exposed portion 132B1 of the second covered electric cable 131B is irradiated with laser light L. The laser light L is emitted from a laser irradiation portion 210a of a laser welding device (not shown) provided as a laser welding unit. The laser light reaches the contact portion via a gap between the insulting cover 133A of the first covered electric cable 131A and the insulting cover 133B of the second covered electric cable 131B.

Figure 31:
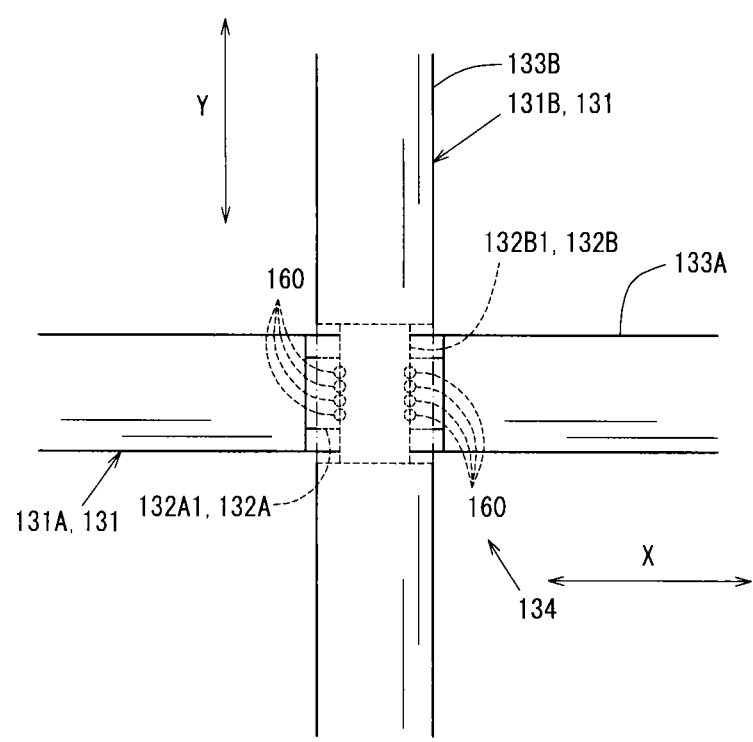
FIG. 31 is a plan view showing show the conductor joining step is performed.

In this step, as shown in FIG. 31, a plurality of welded portions 160 are formed in, for example, the longitudinal direction of the second covered electric cable 131B by the laser light from the laser irradiation portion 210a to weld the core wire 132A of the first covered electric cable 131A and the core wire 132B of the second covered electric cable 131B.

The first covered electric cable 131A and the second covered electric cable 131B are welded in this manner to form the intersecting electric cable group 130. A plurality of such intersecting electric cable groups 130 are stacked to form the electric cable group intersection portion 120. Then, the electric cable group intersection portion 120 is accommodated in the held in the holder 150. Thus, the branch connector 110 is produced.

Production method example 2 described above using the laser welding device provides the following functions and effects.

In production method example 2, as described above, in the conductor joining step, the laser light is directed toward the contact portion of the conductor exposed portions 132A1 and 132B1 via the gap between the insulating cover 133A of the first covered electric cable 131A and the insulating cover 133B of the second covered electric cable 131B.

According to the above-described method, the conductor exposed portions 132A1 and 132B1 are joined together at the contact portion to be conductive to each other by laser irradiation. Laser irradiation realizes strong joint with a high level of energy with pinpoint accuracy. Therefore, for joining the conductor exposed portion 132A1 of the of the first covered electric cable 131A and the conductor exposed portion 132B1 of the second covered electric cable 131B, it is not necessary to remove the insulating cover 133A or 133B of each covered electric cable 131 in a large area in the circumferential direction or in the longitudinal direction. Spot welding is made possible by the laser light L passing the gap between the insulating covers 133 of the covered electric cables 131. The gap has a minimum possible size which allows the laser light L to pass.

Owing to this, strong joint is made possible by the laser light L. In addition, the conductor exposed portions 132A1 and 132B1 are protected against moisture. Thus, the inside of the covered electric cables 131 is prevented against entrance of moisture via a gap between the core wires 132 and the insulating covers 133. Therefore, high electric characteristics are provided.

Now, a branch connector 110P2 in another embodiment will be described.

Among the elements of the branch connector 110P2, substantially the same elements as those in example 3 will bear the same reference signs, and descriptions thereof will be omitted.

Example 4

Figure 32:
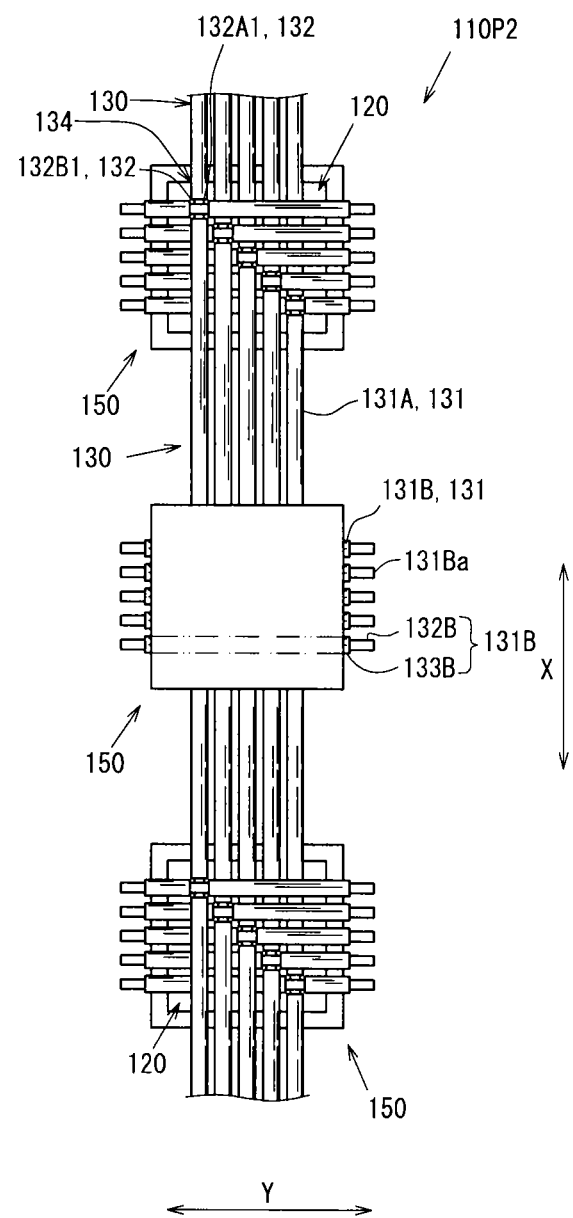
FIG. 32 is a plan view of a branch connector including a plurality of electric cable intersection portions provided in the X direction.

With reference to FIG. 32, a structure of the branch connector 110P2 in example 4 will be described.

The branch connector 110P2 in example 4 includes a plurality of holders 150 and a plurality of electric cable group intersection portions 120.

This will be described in more detail. In the branch connector 110P2, the first covered electric cable 131A as an element of an intersecting electric cable group 130 is longer than the length corresponding to the electric cable group intersection portion 120. Groups each including a plurality of second covered electric cables 131B intersect such first covered electric cables 131A, and have an interval provided in the X direction (longitudinal direction of the first covered electric cables 131A). The first covered electric cables 131A and the second covered electric cables 131B are conductive to each other at the intersection portions thereof.

Namely, the branch connector 110P2 includes the plurality of cable group intersection portions 120 with a certain interval provided in the longitudinal direction of the first covered electric cables 131A. The cable group intersection portions 120 are each accommodated in the holder 150.

According to the above-described structure, the plurality of cable group intersection portions 120 are provided with a certain interval provided in the longitudinal direction of the first covered electric cables 131A, namely, in the X direction. Therefore, the branch connector 110P2 may be compatible to any of a wide variety of complicated wiring patterns.

As described above, the first covered electric cables 131A may be cut at one position or a plurality of positions in the longitudinal direction thereof, so that the first covered electric cables 131A may be put into a non-conductive state at the cut position(s). In accordance with at which position(s) the first covered electric cables 131A are cut, any of a wide variety of patterns is formed.

Example 5

Figure 33:
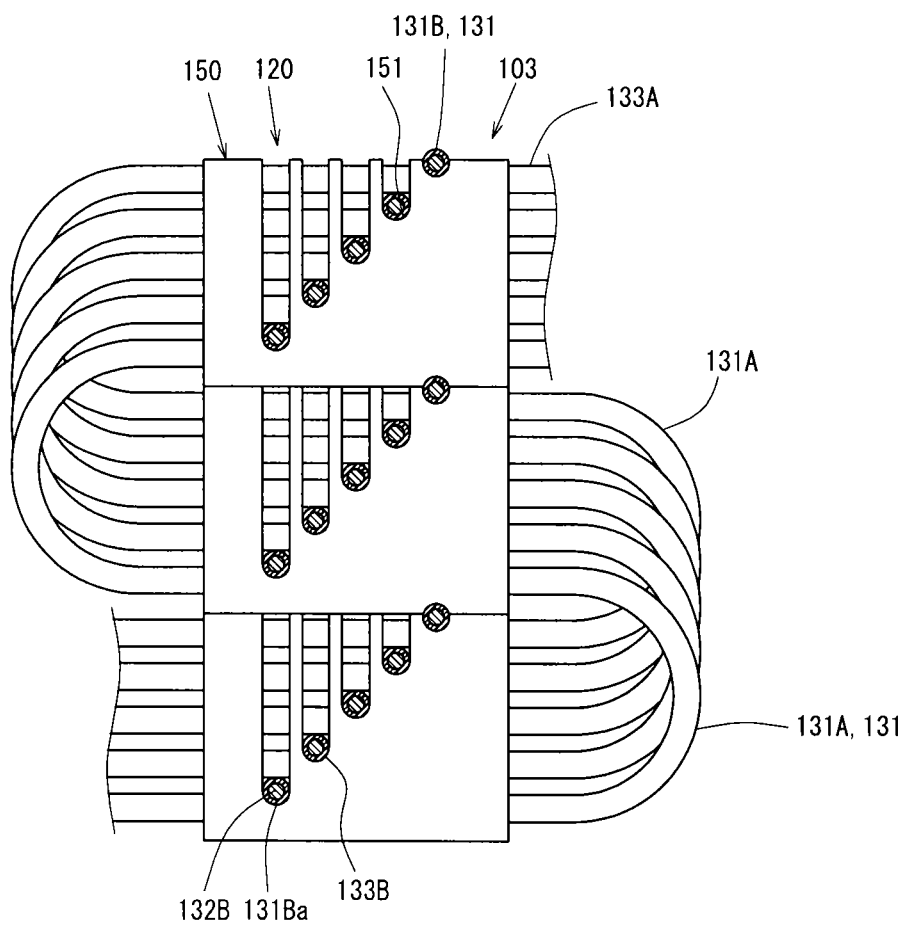
FIG. 33 is a side view of the branch connector having first covered electric cables folded in a hairpin turn manner such that the electric cable intersection portions are stacked.

With reference to FIG. 33, a structure of a branch connector 110P3 in example 5 will be described.

The branch connector 110P3 in example 5 includes the branch connector 110P2 in example 4. The branch connector 110P2 in example 4 includes the plurality of electric cable group intersection portions 120 with a predetermined interval provided in the longitudinal direction of the first covered electric cables 131A. The plurality of electric cable group intersection portions 120 are each accommodated in the holder 150. In branch connector 110P3 in example 5, as shown in FIG. 33, the plurality of holders 150 with a predetermined interval provided in the longitudinal direction of the first covered electric cables 131A are stacked.

In other words, the branch connector 110P3 includes the plurality of electric cable group intersection portions 120 with a predetermined interval provided in the longitudinal direction of the first covered electric cables 131A, and the plurality of holders respectively accommodating the electric cable group intersection portions 120. The first covered electric cables 131A are folded in a hairpin turn manner in the longitudinal direction, such that the holders 150 are stacked.

The branch connector 110P3 is produced as follows. After the intersecting electric cable group positional arrangement step, a hairpin turn step is performed. In hairpin turn step, the first covered electric cables 131A are folded in the longitudinal direction thereof, such that the plurality of electric cable group intersection portions 120 are stacked in the thickness direction thereof.

According to the above-described structure, an end portion 131Ba of each of the plurality of second covered electric cables 131B included in the electric cable group intersection portions 120 is usable as a connection terminal, a plurality of such connection terminals are located in a plane, instead of linearly along the X direction. Therefore, the branch connector 110P3 is usable as a branch connection unit including a great number of connection terminals without requiring a large installation space.

The harness W may be connected to each of the end portions 131Ba of the second covered electric cables 131B in each of the branch connectors 110, 110P2 and 110P3 in example 3 through example 5, so that, for example, the desirable harness connection harness connection structure 100 shown in FIG. 22 is formed.

The electric cable structural body according to the present invention corresponds to the branch connector 110, 110P2 or 110P3 in the embodiment; and similarly;

the conductor corresponds to the conductive core wire 132 (132A, 132B);

the accommodation and holding unit corresponds to the holder 150;

one electrode corresponds to the positive electrode probe 200a;

the other electrode corresponds to the negative electrode probe 200b;

the laser irradiation unit corresponds to the laser irradiation unit 210a;

the harness corresponds to the backbone harness Wm or the branch harness Ws;

the first direction corresponds to the X direction;

the second direction corresponds to the Y direction;

the electric connection structure corresponds to the harness connection structure 100; and the electric cable accommodation unit accommodation step corresponds to the holder accommodation step.

However, the present invention is not limited to the above-described embodiment, and may be carried out in any of various embodiments based on the technological idea shown by the claims.

For example, the electric cable intersection portion 134 is not limited to an intersection of electric cables intersecting each other perpendicularly, and may be an intersection of electric cables intersecting each other at an predetermined angle other than 90 degrees. The first direction may be the Y direction, whereas the second direction may be the X direction.

In example 3 and example 4, the first covered electric cables 131A and the second covered electric cables 131B each include the core wire 132 and the insulating cover 133. The present invention is not limited to this. Alternatively, the core wire 132 may be covered with a mesh-like or thin-film shielding member formed of aluminum or the like, and then may be covered with the insulating cover 133.

The first covered electric cables 131A and the second covered electric cables 131B may each be, for example, a twisted pair cable formed of a plurality of twisted covered electric cables 131.

Alternatively, the core wires 132A of the first covered electric cables 131A and the core wires 132B of the second covered electric cables 131B may be each formed of a single conductive cable, or a twisted cable formed of a plurality of twisted wires.

In the above embodiment, as shown in FIG. 26, the electric cable group intersection portion 120 includes the plurality of intersecting electric cable groups 130 that are stacked such that the welded portions 160 are on a diagonal line of the generally lattice pattern with a predetermined interval in the order in which the intersecting electric cable groups 130 are stacked. The intersecting electric cable groups 130 are not limited to being located in this manner. For example, the electric cable group intersection portion 120 may be located such that the welded portions 160 are not on a diagonal line of the generally lattice pattern. The electric cable group intersection portion 120 may be in any form in accordance with the wiring pattern of the branch connector 110.

In the above embodiment, in the intersection portion 120, the intersecting electric cable groups 130 stacked on each other are not conductive to each other. The present invention is not limited to this. In the intersection portion 120, the intersecting electric cable groups 130 stacked on each other may be conductive to each other.

This will be described specifically. In the above embodiment, among the plurality of electric cable intersection portion 134, the same group electric cable intersection portions R111, R122, R133, R144 and R155 are the electric cable conductive-state intersection portions where the first covered electric cable 131A and the second covered electric cable 131B are connected with each other in a conductive state. The electric cable conductive-state intersection portions may not be limited to the same group electric cable intersection portions R111, R122, R133, R144 and R155. Among the different group electric cable intersection portions R112 through R115, R121, R123 through R125, R131, R132, R134, R135, R141 through R143, R145, and R151 through R154, at least four may be the electric cable conductive-state intersection portions where the first covered electric cable 131A and the second covered electric cable 131B are connected with each other in a conductive state.

A connection terminal such as a crimp terminal or the like and a connector housing may be attached to the first covered electric cable 131A or the second covered electric cable 131B derived from the branch connector 110, so that a connector-attached branch connector 110 may be provided. The connector-attached branch connector 110 may be put into male/female engagement with a connector provided in the backbone harness Wm or the branch harness Ws.

In the above embodiment, the electric cable group intersection portion 120 is accommodated and held in the holder 150. The present invention is not limited to this. Any structure accommodating and holding the electric cable group intersection portion 120 may be usable. For example, a cover that covers the holder 150 may be provided, such that the cover and the holder 150 may hold the electric cable group intersection portion 120 in cooperation with each other.

For example, after the intersecting electric cable groups 130 are stacked to form a generally lattice pattern, the electric cable group intersection portion 120 may be held by an insulating sheet from both of two sides in the thickness direction.

The electric cable group intersection portion 120 does not need to be accommodated and held in the holder 150. As long as the overall shape of the electric cable group intersection portion 120 is maintained, only the electric cable intersection portions 134 may be coated with an insulating synthetic resin to guarantee the insulating property.

In the above embodiment, for stacking the intersecting electric cable groups 130 to form a generally lattice pattern in the intersecting electric cable group positional arrangement step, an intersecting electric cable group 130 is stacked on another electric cable group 130 that is already located. Thus, the intersecting electric cable groups 130 are stacked from one side of the electric cable group intersection portion 120 in the thickness direction thereof. The present invention is not limited to such a positional arrangement.

For example, in the intersecting electric cable group positional arrangement step, the intersecting electric cable groups 130 may be located to form a generally lattice pattern such that the first covered electric cables 131A included in the plurality of intersecting electric cable groups 130 are respectively at the same level, namely, in the same plane, with the second covered electric cables 131B, and such that the second covered electric cables 131B included in one intersecting electric cable group 130 are at the same level, namely, in the same plane, with the second covered electric cables 131B included in another intersecting electric cable group 130.

Owing to this, the thickness of the electric cable group intersection portion 120 is not increased, and thus the branch connector 110 including the holder 150 is compact.

The branch connector 110P2 in example 4 includes the plurality of electric cable group intersection portions 120 at a certain interval provided in the longitudinal direction of the first covered electric cables 131A. The present invention is not limited to this. Each of intervals between adjacent electric cable group intersection portions 120 may be arbitrarily set.

In the intersecting electric cable group positional arrangement step, at least either one of the first covered electric cables 131A and the second covered electric cables 131B which do not form the electric cable group intersection portion 120 may be positionally arranged, in addition to the intersecting electric cable groups 130.

In the intersecting electric cable group positional arrangement step, at least either one of the first covered electric cables 131A and the second covered electric cables 131B which do not form the intersecting electric cable groups 130 may be located to form the electric cable group intersection portion 120, in addition to, or instead of, the intersecting electric cable groups 130 being positionally arranged.

In production method example 1, in the conductor joining step, the positive electrode probe 200$a$ is put into contact with the conductor exposed portion 132A1 of the first covered electric cable 131A, and the negative electrode probe 200$b$ is put into contact with the conductor exposed portion 132B1 of the second covered electric cable 131B. Alternatively, the positive electrode probe 200$a$ may be put into contact with the conductor exposed portion 132B1 of the second covered electric cable 131B, whereas the negative electrode probe 200$b$ may be put into contact with the conductor exposed portion 132B1 of the second covered electric cable 131B, to weld the conductor exposed portions 132A1 and 132B1.

In the conductor joining step, the welding of the conductor exposed portions 132A1 and 132B1 is not limited to being performed by the laser light or the electrodes as described above. The welding may be performed by supersonic connection, application of a conductive adhesive, soldering, or a combination thereof.

REFERENCE SIGNS LIST

X . . . First direction
Y . . . Second direction
Z . . . Stacking direction
G1 . . . First direction exposed conductor group
G2 . . . Second direction exposed conductor group
GW . . . Intersection overlap portion
3 . . . Backbone harness
4 . . . Branch harness
10 . . . Electric cable structural body
11 . . . First flat cable
12 . . . Second flat cable
11$a$, 12$a$ . . . Rectangular conductor
11$b$, 12$b$ . . . Insulating cover
11$c$, 12$c$ . . . Exposed conductor portion
12$d$ . . . Terminal portion
20 . . . Electric cable structural body
21 . . . First covered electric cable
22 . . . Second covered electric cable
21$a$, 22$a$ . . . First round conductor, second round conductor
21$b$, 22$b$ . . . Insulating cover
21$c$, 22$c$ . . . Exposed conductor portion
22$d$ . . . Terminal portion
40 . . . Intersection insulating film
40$a$ . . . Window
50 . . . Outer insulating film
60 . . . Insulating holder
100 . . . Harness connection structure
110, 110P2, 110P3 . . . Branch connector
120 . . . Electric cable group intersection portion
130 . . . Intersecting electric cable group
131 . . . Covered electric cable
131A (131) . . . First covered electric cable
131B (131) . . . Second covered electric cable
131Ba . . . End portion of the second covered electric cable
132A, 132B . . . Conductive core wire
132A1, 132B1 . . . Conductor exposed portion
133A, 133B . . . Insulating cover
134 . . . Electric cable intersection portion
150 . . . Holder
200$a$ . . . Positive electrode probe 200b . . . Negative electrode probe
210a . . . Laser irradiation portion
Wm . . . Backbone harness
Ws . . . Branch harness

The invention claimed is:

1. An electric cable structural body, comprising:
a first direction exposed conductor group including a plurality of exposed conductor portions extending in a first direction while being parallel to each other;
a second direction exposed conductor group including a plurality of exposed conductor portions extending in a second direction while being parallel to each other,
wherein:
the plurality of exposed conductor portions are each obtained from a conductor covered with an insulating cover by removing a predetermined length of the insulating cover in a longitudinal direction, and a plurality of the conductors are rectangular conductors located with an interval provided in a width direction and are held between insulating films to form a flat cable, and
the first direction exposed conductor group and the second direction exposed conductor group intersect and overlap each other to form an intersection overlap portion;
the electric cable structural body further comprising:
the insulating cover that covers a side of the intersection overlap portion that is opposite to an overlap side; and
an insulating structure provided between the first direction exposed conductor group and the second direction exposed conductor group at the intersection overlap portion, the insulating structure electrically insulating the exposed conductor portions from each other,
wherein:
the insulating structure has windows at positions corresponding to conductor intersection portions at which the exposed conductor portions are to be conductive to each other, among intersection portions at which the exposed conductor portions intersect each other, the windows passing through the insulating structure such that the exposed conductor portions intersecting each other face each other via the windows, and
the exposed conductor portions facing each other via the windows are connected to be conductive to each other; and
wherein:
a plurality of the first direction exposed conductor groups are provided in the longitudinal direction with an interval,
a plurality of the second direction exposed conductor groups are provided to respectively overlap the plurality of the first direction exposed conductor groups extending in the longitudinal direction to provide a plurality of intersection overlap portions in the longitudinal direction,
the insulating cover is provided between adjacent intersection overlap portions among the plurality of intersection overlap portions, and
the electric cable structural body is folded such that the plurality of intersection overlap portions are stacked in a stacking direction.

2. An electric cable structural body, comprising:
a first direction exposed conductor group including a plurality of exposed conductor portions extending in a first direction while being parallel to each other;
a second direction exposed conductor group including a plurality of exposed conductor portions extending in a second direction while being parallel to each other,
wherein:
the plurality of exposed conductor portions are each obtained from a conductor covered with an insulating cover by removing a predetermined length of the insulating cover in a longitudinal direction, and
the first direction exposed conductor group and the second direction exposed conductor group intersect and overlap each other to form an intersection overlap portion;
the electric cable structural body further comprising:
the insulating cover that covers a side of the intersection overlap portion that is opposite to an overlap side, and a plurality of the conductors are each covered with the insulating cover; and
an insulating structure provided between the first direction exposed conductor group and the second direction exposed conductor group at the intersection overlap portion, the insulating structure electrically insulating the exposed conductor portions from each other,
wherein:
the insulating structure has windows at positions corresponding to conductor intersection portions at which the exposed conductor portions are to be conductive to each other, among intersection portions at which the exposed conductor portions intersect each other, the windows passing through the insulating structure such that the exposed conductor portions intersecting each other face each other via the windows, and
the exposed conductor portions facing each other via the windows are connected to be conductive to each other; and
wherein:
the insulating cover is formed of an insulating synthetic resin, the insulating cover being an insulating holder to accommodate and hold the intersection overlap portion, and an accommodating portion in the insulating holder that accommodates the intersection overlap portion includes grooves that engageably hold covered electric cables that each include a conductor and an insulating cover that covers the conductor.

3. An electric cable structural body according to claim 2, wherein:
a plurality of the first direction exposed conductor groups are provided in the longitudinal direction with an interval; and
a plurality of the second direction exposed conductor groups are provided to respectively overlap the plurality of the first direction exposed conductor groups extending in the longitudinal direction to provide a plurality of intersection overlap portions in the longitudinal direction.

4. An electric cable structural body according to claim 3, which is folded such that the plurality of intersection overlap portions are stacked in a stacking direction.

5. An electric cable structural body according to claim 2, wherein a plurality of the conductors are rectangular conductors located with an interval provided in a width direction and are held between insulating films to form a flat cable.

6. An electric cable structural body according claim 1, wherein a plurality of the conductors are each covered with the insulating cover.

7. An electric connection structure, comprising:
an electric cable structural body according to claim 1; and
a harness connected to at least one of the conductors included in the second direction exposed conductor group.

8. A method for producing an electric structural body, comprising:
- removing, from a conductor covered with an insulating cover, a predetermined length of the insulating cover in a longitudinal direction to expose the conductor to form an exposed conductor portion;
- locating a first direction exposed conductor group and a second direction exposed conductor group so as to intersect and overlap each other to form an intersection overlap portion, the first direction exposed conductor group including a plurality of the exposed conductor portions extending in a first direction while being parallel to each other, and the second direction exposed conductor group including a plurality of the exposed conductor portions extending in a second direction while being parallel to each other;
- locating an insulating structure between the first direction exposed conductor group and the second direction exposed conductor group at the intersection overlap portion, the insulating structure electrically insulating the exposed conductor portions from each other, and having windows at positions corresponding to conductor intersection portions at which the exposed conductor portions are to be conductive to each other, among intersection portions at which the exposed conductor portions intersect each other;
- connecting the exposed conductor portions facing each other via the windows of the insulating structure so as to be conductive to each other;
- providing a plurality of the first direction exposed conductor groups in the longitudinal direction with an interval;
- providing a plurality of the second direction exposed conductor groups so as to respectively overlap the plurality of the first direction exposed conductor groups extending in the longitudinal direction to provide a plurality of intersection overlap portions in the longitudinal direction, and the insulating cover is provided between adjacent intersection overlap portions among the plurality of intersection overlap portions; and
- folding the electric structural body such that the plurality of intersection overlap portions are stacked in a stacking direction.

9. An electric cable structural body, comprising:
covered electric cables each including one conductor and an insulating cover that covers the conductor, the covered electric cables including first covered electric cables extending in a first direction and second covered electric cables extending in a second direction intersecting the first direction;
wherein:
the conductor of each of the first covered electric cables and the conductor of each of the second covered electric cables are joined together at an intersection portion thereof so as to be connected to be conductive to each other to form an intersecting electric cable group,
a plurality of the intersecting electric cable groups are located such that the first covered electric cables are parallel to each other and the second covered electric cables are parallel to each other to form an electric cable group intersection portion in which the first covered electric cables and the second covered electric cables intersect each other in a same plane,
the plurality of the intersecting electric cable groups each include the second covered electric cables intersecting the first covered electric cables, the second covered electric cables are located with an interval provided in a longitudinal direction of the first covered electric cables, and the intersection portions of the first covered electric cables and the second covered electric cables are in a conductive state, and
the first covered electric cables are cut at one position or a plurality of positions in the longitudinal direction;
the electric cable structural body further comprising:
a holder that accommodates and holds the electric cable group intersection portion, the electric cable group intersection portion including the plurality of the intersecting electric cable groups stacked to form a lattice pattern, the holder is formed of an insulating synthetic resin, and the holder includes holding grooves that each engageably hold the first covered electric cables or the second covered electric cables; and
wherein:
a plurality of electric cable group intersection portions are located in the longitudinal direction of the first covered electric cables, and the first covered electric cables are folded in a hairpin turn manner such that the plurality of electric cable group intersection portions are stacked in a thickness direction.

10. An electric connection structure, comprising:
an electric cable structural body according to claim 9; and
a harness connected to at least one of end portions of the second covered electric cables of the electric cable structural body.

11. An electric cable structural body according to claim 9, wherein a plurality of the holders are stacked in the thickness direction.

12. An electric cable structural body according to claim 11, wherein the plurality of the intersecting electric cable groups are stacked from one side of the electric cable group intersection portion such that welded portions are on a diagonal line of the lattice pattern with a predetermined interval in an order in which the intersecting electric cable groups are stacked.

13. An electric connection structure, comprising:
an electric cable structural body according to claim 11; and
a harness connected to at least one of end portions of the second covered electric cables of the electric cable structural body.

14. An electric cable structural body according to claim 9, wherein the plurality of the intersecting electric cable groups are stacked from one side of the electric cable group intersection portion such that welded portions are on a diagonal line of the lattice pattern with a predetermined interval in an order in which the intersecting electric cable groups are stacked.

15. An electric connection structure, comprising:
an electric cable structural body according to claim 14; and
a harness connected to at least one of end portions of the second covered electric cables of the electric cable structural body.

* * * * *